US011417210B1

(12) United States Patent
Li et al.

(10) Patent No.: US 11,417,210 B1
(45) Date of Patent: *Aug. 16, 2022

(54) AUTONOMOUS PARKING MONITOR

(71) Applicant: Knightscope, Inc., Mountain View, CA (US)

(72) Inventors: William Santana Li, Mountain View, CA (US); Phillip Wong, San Francisco, CA (US); Stacy Dean Stephens, McKinney, TX (US); Mercedes Soria-Li, Mountain View, CA (US); Dominic A. Villa, Sunnyvale, CA (US); Aaron J. Lehnhardt, Mission Viejo, CA (US); Nicholas L. Xydes, San Jose, CA (US); Ina L. Liu, Alameda, CA (US); Hen-You Tan, San Mateo, CA (US); Arne Stoschek, Palo Alto, CA (US)

(73) Assignee: KNIGHTSCOPE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,438

(22) Filed: Jul. 9, 2020

Related U.S. Application Data

(63) Continuation of application No. 16/385,719, filed on Apr. 16, 2019, now abandoned, which is a
(Continued)

(51) Int. Cl.
*B60Q 1/48* (2006.01)
*G08G 1/14* (2006.01)
(Continued)

(52) U.S. Cl.
CPC ............. *G08G 1/142* (2013.01); *G06V 20/10* (2022.01); *G06V 20/54* (2022.01); *G06V 20/586* (2022.01);
(Continued)

(58) Field of Classification Search
CPC ........ G08G 1/142; G08G 1/052; G08G 1/147; G08G 1/146; G08G 1/168; G08G 1/0129;
(Continued)

(56) References Cited

U.S. PATENT DOCUMENTS 5,446,445 A * 8/1995 Bloomfield ............ G08B 25/10
340/521
6,374,155 B1 * 4/2002 Wallach ............... G05D 1/0274
700/245
(Continued)

FOREIGN PATENT DOCUMENTS

CN 104699098 A 6/2015

OTHER PUBLICATIONS

Co-pending U.S. Appl. No. 16/385,719, inventors Li; William Santana et al., filed Apr. 16, 2019.
(Continued)

*Primary Examiner* — Anh V La
(74) *Attorney, Agent, or Firm* — Wilson Sonsini Goodrich & Rosati

(57) ABSTRACT

Systems, methods, and devices for autonomous monitoring of parking areas are provided. In one aspect, a method for collecting information associated with a parking space includes providing a self-propelled autonomous data machine comprising one or more sensors. The autonomous data machine can be navigated to a location near a parking space for a vehicle. Parking information pertaining to the parking space can be obtained via the one or more sensors of the autonomous data machine. The obtained parking information can include at least occupancy data for the parking space. The parking information can be transmitted to a remote computing system configured to display the parking information to a user.

17 Claims, 28 Drawing Sheets

Related U.S. Application Data continuation of application No. 15/691,670, filed on Aug. 30, 2017, now Pat. No. 10,311,731, which is a continuation-in-part of application No. 14/855,724, filed on Sep. 16, 2015, now Pat. No. 9,773,413.

(60) Provisional application No. 62/051,278, filed on Sep. 16, 2014.

(51) Int. Cl.

| | | |
|---|---|---|
| *G08G 1/16* | (2006.01) | |
| *G08G 1/01* | (2006.01) | |
| *G08G 1/052* | (2006.01) | |
| *G06V 20/10* | (2022.01) | |
| *G06V 20/54* | (2022.01) | |
| *G06V 20/58* | (2022.01) | |
| *G06V 20/62* | (2022.01) | |

(52) U.S. Cl.
CPC .......... *G08G 1/012* (2013.01); *G08G 1/0129* (2013.01); *G08G 1/052* (2013.01); *G08G 1/146* (2013.01); *G08G 1/147* (2013.01); *G08G 1/168* (2013.01); *G06V 20/625* (2022.01)

(58) Field of Classification Search
CPC .............. G08G 1/012; G06K 9/00785; G06K 9/00812; G06K 9/00664; G06K 2209/15; G06V 20/10; G06V 20/54; G06V 20/586; G06V 20/625
USPC .......... 340/932.2, 933, 937; 348/148; 701/1, 701/117
See application file for complete search history.

(56) References Cited

U.S. PATENT DOCUMENTS

| | | |
|---|---|---|
| 6,747,687 B1 | 6/2004 | Alves |
| 7,119,715 B2 | 10/2006 | Orita |
| 7,539,557 B2 * | 5/2009 | Yamauchi ............ G05D 1/0038 340/12.54 |
| 7,584,045 B2 * | 9/2009 | Peretz .................... A62C 27/00 104/263 |
| 8,639,644 B1 | 1/2014 | Hickman et al. |
| 9,773,413 B1 | 9/2017 | Li et al. |
| 10,311,731 B1 | 6/2019 | Li et al. |
| 2007/0100496 A1 | 5/2007 | Forell |
| 2009/0210092 A1 | 8/2009 | Park et al. |
| 2009/0265193 A1 | 10/2009 | Collins et al. |
| 2010/0325973 A1 | 12/2010 | Hirshberg |
| 2011/0178635 A1 | 7/2011 | Anderson et al. |
| 2012/0215383 A1 | 8/2012 | Yoon et al. |

OTHER PUBLICATIONS

Kümmerle et al. Autonomous driving in a multi-level parking structure. Robotics and Automation, 2009. ICRA '09. IEEE International Conference on May 12-17, 2009. DOI: 10.1109/ROBOT. 2009.5152365.
Notice of Allowance dated May 30, 2017 for U.S. Appl. No. 14/855,724.
Office Action dated Sep. 26, 2016 for U.S. Appl. No. 14/855,724.
U.S. Appl. No. 15/691,670 Notice of Allowance dated Jan. 17, 2019.
U.S. Appl. No. 15/691,670 Office Action dated Jun. 29, 2018.
U.S. Appl. No. 16/385,719 Office Action dated Jan. 9, 2020.

* cited by examiner

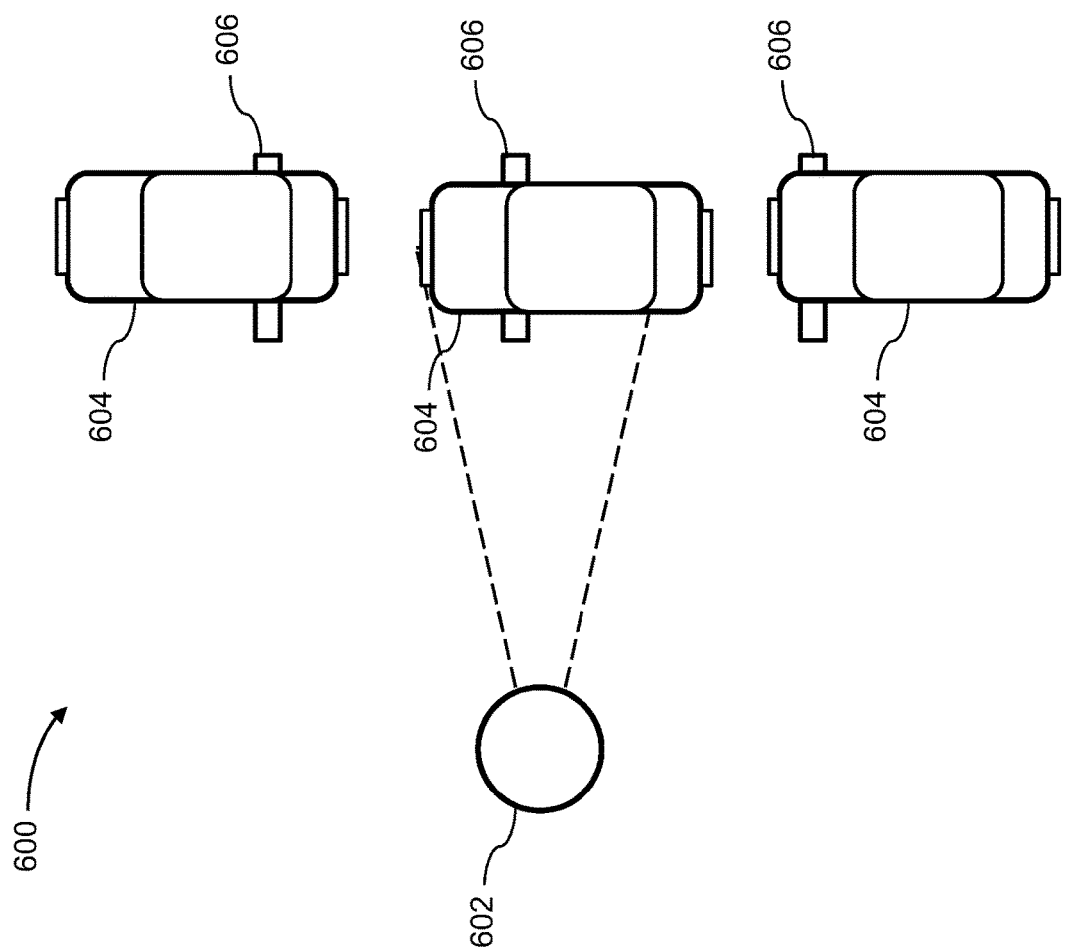

DAILY PARKING UTILIZATION

| Sector | Start-time | End-time | Utilization |
|---|---|---|---|
| ZONE 1 | 11:04:11 | 12:04:11 | low |
| ZONE 1 | 10:04:11 | 11:04:11 | low |
| ZONE 1 | 09:04:11 | 10:04:11 | low |
| ZONE 1 | 08:04:11 | 09:04:11 | low |
| ZONE 1 | 07:04:11 | 08:04:11 | medium |
| ZONE 1 | 06:04:11 | 07:04:11 | low |
| ZONE 1 | 05:04:11 | 06:04:11 | low |
| ZONE 1 | 04:04:11 | 05:04:11 | low |
| ZONE 1 | 03:04:11 | 04:04:11 | low |
| ZONE 1 | 02:04:11 | 03:04:11 | low |
| ZONE 1 | 01:04:11 | 02:04:11 | low |
| ZONE 1 | 00:04:11 | 01:04:11 | low |
| ZONE 1 | 23:04:11 | 00:04:11 | low |
| ZONE 1 | 22:04:11 | 23:04:11 | low |
| ZONE 1 | 21:04:11 | 22:04:11 | low |
| ZONE 1 | 20:04:11 | 21:04:11 | low |
| ZONE 1 | 19:04:11 | 20:04:11 | low |

FIG. 7C

TOP TEN PARKING

| Plate Number | Total Hours |
|---|---|
| 7438711 | 11 |
| 8016921 | 11 |
| 8L44181 | 10 |
| 7170711 | 10 |
| 8N31417 | 10 |
| 8I44181 | 9 |
| 8016921 | 9 |
| 7KK0351 | 8 |
| 7730711 | 7 |
| 7170711 | 6 |

ADD LICENSE PLATE

License Plate Type: ← 786
Plate Number: ← 787
Owner: ← 788

Select One
● White List
● Black List
● Exclusion List

Plate Number  Owner
1234567       xyz

785

AUTONOMOUS PARKING MONITOR

CROSS-REFERENCE

This application is a continuation application of U.S. application Ser. No. 16/385,719, filed Apr. 16, 2019, which is a continuation application of U.S. application Ser. No. 15/691,670, filed Aug. 30, 2017, which is a continuation-in-part of U.S. application Ser. No. 14/855,724, filed Sep. 16, 2015, which claims the benefit of U.S. Provisional Application No. 62/051,278, filed Sep. 16, 2014, each of which is incorporated herein by reference in its entirety.

BACKGROUND

Surveillance and monitoring of vehicle parking areas may be useful for a wide variety of applications, such as security, law enforcement, property management, urban planning, and commercial operations. Additionally, the ability to obtain real-time information regarding parking space occupancy may be beneficial to individual vehicle owners in terms of reducing the time and effort needed to locate available parking spaces.

In some instances, however, prior approaches for monitoring parking areas may be less than ideal. For example, prior methods for obtaining information related to parking space occupancy and other parking-related data may rely upon monitoring performed by human employees, thereby increasing personnel and labor costs, as well as reducing the efficiency and speed of data collection. Additionally, prior systems for automated or semi-automated parking surveillance may require the installation of specialized equipment in a specific parking area, thereby limiting the flexibility and applicability of such systems.

SUMMARY

The present disclosure provides systems, methods, and devices for obtaining information related to parking areas. In some embodiments, an autonomous data machine having a plurality of sensors can be employed to monitor one or more parking spaces within a parking area. The approaches described herein provide semi-autonomous and/or fully autonomous collection of parking information, thereby enhancing the convenience, efficiency, and availability of such data collection while reducing the need for human involvement.

Thus, in one aspect, method for collecting information associated with a parking space is provided. The method includes providing a self-propelled autonomous data machine comprising one or more sensors. The autonomous data machine can be navigated to a location within sensing range of a parking space for a vehicle. Parking information pertaining to the parking space can be obtained via the one or more sensors of the autonomous data machine. The obtained parking information can include at least occupancy data for the parking space. The parking information can be transmitted to a remote computing system configured to display the parking information to a user.

In some embodiments, the parking information is displayed to the user along with security information for an environment of the parking space. The autonomous data machine may be capable of navigating to the location near the parking space autonomously or semi-autonomously without direct manual control by a user. The one or more sensors may include a vision sensor and at least one other type of sensor, such as any of the types of sensors as described elsewhere herein. The parking information may include at least license plate information regarding a vehicle occupying the parking space when the vehicle occupies the parking space. The parking information may include information on a type of parking space (e.g., handicap, visitor, electric vehicle charging, maternity, carpool, permitted parking, or any other type). The method may include comparing the license plate information with a whitelist, blacklist, enforced list, or exclusion list of vehicles. The method may also include displaying information about a threat associated with the license plate information when the threat is detected by the autonomous data machine. Examples of a threat may include, but are not limited to, an abandoned vehicle, vehicle without a permit, or a stolen vehicle. A comparison may be made with an internal list. By providing feedback to the internal list, licensing plate readings may be made more accurate, and/or false positives may be better identified. The parking information may include at least a visual image of the parking space captured by the one or more sensors of the autonomous data machine.

Additional aspects of the invention may be directed to a computing system for providing information associated with a parking space, the system comprising: a communication unit configured to receive parking information from a self-propelled autonomous data machine, wherein the autonomous data machine (1) comprises one or more sensors, (2) navigates to a location within sensing range of the parking space for a vehicle, and (3) obtains and/or processes, via the one or more sensors, the parking information pertaining to the parking space; and a display configured to show the parking information to a user.

Optionally, the display may show a parking utilization for one or more parking sectors within a monitored area. The parking utilization can be determined with aid of one or more autonomous data machines that collect information about occupancy of one or more parking spaces within the monitored area. The display may show vehicle identification information for one or more vehicles that are parked within a monitored area for a period of time that exceeds a predetermined time threshold. The display may show a visual map of a monitored area. The visual map may include a visual representation of one or more parking spaces within the monitored area and likely occupancy information pertaining to the one or more parking spaces. The parking information may include occupancy data for the parking space, license plate for the vehicle at the parking space, or a threat associated with the parking space if applicable.

Furthermore, aspects of the invention may be directed to an autonomous data machine for collecting information associated with a parking space, the autonomous data machine comprising: one or more self-propulsion units configured to navigate the autonomous data machine to a location within sensing range of the parking space for a vehicle; one or more sensors configured to obtain parking information pertaining to the parking space, the parking information including at least occupancy data for the parking space; and a communication unit configured to transmit the parking information to a remote computing system configured to display the parking information to a user.

The autonomous data machine may include one or more processors, individually or collectively configured to determine a presence of a threat based on data collected using the one or more sensors. In some embodiments, the one or more processors may be individually or collectively configured to determine a threat type or reason based on the data collected using the one or more sensors. The one or more sensors include two or more of the following types of sensors: vision sensors, lidar, IMUs, or GPS. The one or more sensors may include a camera configured to collect a visual image of the parking space, and wherein the parking information includes the visual image of the parking space.

Aspects of the invention may be directed to a method for collecting information associated with a parking space, the method comprising: providing a self-propelled autonomous data machine comprising one or more sensors; navigating the autonomous data machine within a multi-level parking structure comprising at least one parking space for a vehicle; obtaining, via the one or more sensors, parking information pertaining to the parking space; and transmitting the parking information to a remote computing system.

In some embodiments, the method may further comprise detecting one or more ramps connecting different levels of the multi-level parking structure while the autonomous data machine is navigating within the multi-level parking structure. The remote computing system may be configured to display a floor of the multi-level parking structure which is occupied by the autonomous data machine. The remote computing system may be configured to display the parking information to a user along with security information for an environment of the parking space. The autonomous data machine may be capable of navigating to the location near the parking space autonomously or semi-autonomously without direct manual control by a user. The one or more sensors includes a vision sensor and at least one other type of sensor.

The parking information may include at least license plate information regarding a vehicle occupying the parking space when the vehicle occupies the parking space. The license plate information may be compared with a white list, black list, enforced list, or exclusion list of vehicles. Information may be displayed about a threat associated with the license plate information when the threat is detected by the autonomous data machine. In some embodiments, the parking information may include at least a visual image of the parking space captured by the one or more sensors of the autonomous data machine.

Additional aspects of the invention are directed to a computing system for providing information associated with a parking space, the system comprising: a communication unit configured to receive parking information from a self-propelled autonomous data machine, wherein the autonomous data machine (1) comprises one or more sensors, (2) navigates within a multi-level parking structure comprising the parking space for a vehicle, and (3) obtains, via the one or more sensors, the parking information pertaining to the parking space; and a display configured to show the parking information to a user.

In some embodiments, the display shows a floor of the multi-level parking structure occupied by the autonomous data machine. The display may show a location on a ramp connecting different floors occupied by the autonomous data machine when the autonomous data machine is on the ramp, as well as an indication of a portion of the ramp on a different floor. The display may show a parking utilization for one or more parking sectors within a monitored area. The parking utilization may be determined with aid of one or more autonomous data machines that collect information about occupancy of one or more parking spaces within the monitored area. The display may show vehicle identification information for one or more vehicles that are parked within a monitored area for a period of time that exceeds a predetermined time threshold. The display may show a visual map of a monitored area.

Moreover, aspects of the invention may be directed to an autonomous data machine for collecting information associated with a parking space, the autonomous data machine comprising: one or more self-propulsion units configured to navigate the autonomous data machine between floors within a multi-level parking structure comprising the parking space; one or more sensors configured to obtain parking information pertaining to the parking space; and a communication unit configured to transmit the parking information to a remote computing system.

In some embodiments, the autonomous data machine may comprise one or more processors, individually or collectively configured to determine a presence of a ramp between the floors based on data collected using the one or more sensors. The one or more sensors may include two or more of the following types of sensors: vision sensors, lidar, IMUs, or GPS.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6 illustrates an autonomous data machine monitoring a parking area with vehicles parked outside the parking boundaries, in accordance with embodiments;

FIGS. 7C and 7D illustrate additional examples of user interfaces for displaying parking information, in accordance with embodiments;

FIGS. 7E and 7F illustrate further examples of user interfaces for displaying parking information, in accordance with embodiments;

DETAILED DESCRIPTION OF THE INVENTION

Figure 1A:
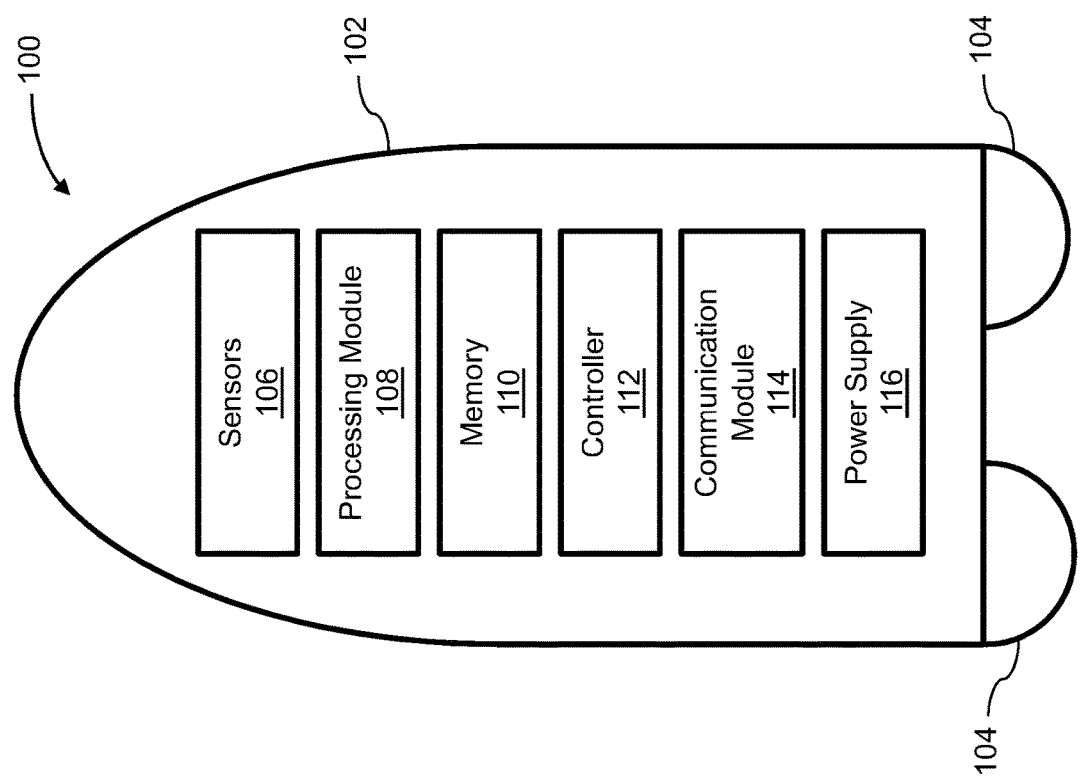
FIG. 1A illustrates an autonomous data machine for autonomous navigation within an environment, in accordance with embodiments.

Systems, methods, and devices are provided for monitoring parking areas, such as parking lots, parking garages, street parking, or any other location having one or more spaces for parking vehicles. In some embodiments, an autonomous data machine (ADM) having multiple sensors can be employed to autonomously navigate and monitor parking areas so as to provide relevant parking information. For example, the autonomous data machine can collect data relating to parking space occupancy, vehicle identification information (e.g., license plate information), vehicle type, and so on. The information obtained by the autonomous data machine can be transmitted and displayed to a user (e.g., driver, parking lot attendant or operator, security personnel, law enforcement personnel) via a suitable user interface (UI). Advantageously, the embodiments described herein permit autonomous collection and aggregation of parking information, thereby improving efficiency and convenience for users of the parking information. Such embodiments may be particularly advantageous for security purposes and other applications related to monitoring of parking areas. In some embodiments, the systems and methods provided may be useful for aiding in helping individuals find their cars in a parking area.

An ADM may be a self-propelled robot capable of navigating within an environment (e.g., ground, water, and/or aerial environments) autonomously, semi-autonomously, and/or while controlled by a human operator. In some instances, the ADM may navigate within an environment autonomously or semi-autonomously without requiring user control or intervention. In some instances, no direct manual control is provided from a user to the ADM. A user may designate a destination or a set of parameters that an ADM may autonomously or semi-autonomously operate within without requiring direct manual control by the user. Alternatively, direct manual control by the user may be provided.

An ADM can include a suitable propulsion system having any suitable combination of components, such as wheels, rollers, treads, axles, propellers, engines, motors, and the like. For example, a ground-based propulsion system can enable an ADM to travel over various types of terrain, including paved surfaces (e.g., roads, sidewalks), unpaved surfaces (e.g., grass, dirt, gravel), flat surfaces, inclined or uneven surfaces (e.g., hills, slopes, speed bumps), and so on. The propulsion system of the ADM can enable it to move within the environment with up to six degrees of freedom of motion (e.g., up to three degrees of freedom in translation, up to three degrees of freedom in rotation). In some instances, the movement of the ADM may be constrained with respect to one or more degrees of freedom. For example, the ADM may be limited to movements on the ground.

In some instances, an ADM can be designed to operate within populated environments, such as urban or suburban environments. Such an ADM may be specifically adapted to detect and/or interact with humans, animals, plants, vehicles, manmade structures (e.g., buildings, roads, traffic signals), or any other entities that are commonly found within in a populated setting. For example, an ADM may capable of identifying and avoiding collisions with objects, humans, animals, vehicles; avoiding drop-offs; and so on. As another example, an ADM operating within an urban environment (e.g., within a city) may be capable of identifying and obeying traffic signals (e.g., traffic lights, stop signs, road markers, etc.). In some instances, an ADM may be deployed in relatively less populated environments, such as rural environments.

The autonomous navigation capabilities of the ADMs provided herein may utilize various parameters, such as data received from vehicle sensors (described in greater detail below), supporting signals received from various sources (e.g., GPS beacons, color patterns, RFID), autonomous vehicle navigation algorithms (e.g., implemented by a suitable on-board processor and/or controller), and information regarding the environment (e.g., maps, waypoints, etc. stored in an on-board memory or transmitted to the ADM from a remote source). In some embodiments, ADM navigation may utilize information (e.g., previously provided information) of landmarks within the environment, which may be manmade or natural structures such as markers and paint on the ground surface (e.g., parking space markers, described below), trees, buildings, hard structures, curbs, traffic signs and other types of signs, lamp posts, fences, walls, and the like.

An ADM may be adapted to perform one or more tasks or missions. The tasks may be performed in parallel, in sequence, or suitable combinations thereof. Exemplary tasks that may be performed by an ADM include: monitoring and patrolling an area (e.g., buildings and property such as warehouses, factories and manufacturing facilities, data centers, storage areas, shopping areas, corporate campuses, parking areas, etc.); monitoring and tracking of objects such as assets, human beings (e.g., human activity such as human traffic or motion), vehicles, and the like (e.g., using sensors such as RFID sensors, optical character recognition, identification of physical properties of objects, etc.); interaction and communication with other entities (e.g., human beings, existing security installations, other ADMs); and delivery of objects (e.g., packages, mail, other physical items). An ADM may be capable of performing different tasks in combination with each other. For example, patrolling of an area of interest may be performed in combination with monitoring and tracking of assets, human activity, and/or vehicles, such as to identify available parking area in a parking lot or corporate campus. As another example, an ADM may be configured to patrol an area and also deliver goods, such as delivering boxes at a corporate campus while providing security services.

An ADM may operate as an individual robot or as part of a fleet of multiple ADMs. For example, a plurality of ADMs can be deployed to monitor an area of interest, with each ADM responsible for a specific portion of the area. Optionally, some ADMs in a fleet may be assigned different tasks than other ADMs. The various ADMs may be capable of communicating with each other and/or with a control center so as to coordinate their movements and operations. A control center may or may not be utilized. In some instances, ADMs may be linked together in a distributed system where each may be capable of communicating with others. In some embodiments, a plurality of ADMs can cooperate with each other in order to complete one or more assigned tasks. The plurality of ADMs may be capable of communication and coordination as a homogenous team to complete one or more assigned tasks. Alternatively, the ADMs may operate independently from each other.

Turning now the drawings, FIG. 1A illustrates an ADM 100 for autonomous navigation within an environment, in accordance with embodiments. The ADM 100 can include a housing 102 and a propulsion system including a plurality of wheels 104 for enabling self-propelled movement of the ADM 100. The ADM 100 can include a plurality of functional modules carried on or within the housing 102, such as sensors 106, processing module 108, memory 110, controller 112, communication module 114, and a power supply 116.

The sensors 106 can be used to obtain information regarding the environment surrounding the ADM 100, as well as obtain information pertaining to various types of objects within the environment (e.g., humans, vehicles, plants, buildings, etc.). The ADM 100 can include any suitable number, type, and combination of sensors 106, such as global positioning system (GPS) sensors, vision sensors (e.g., cameras), thermal cameras, infrared sensors, ultraviolet sensors, lidar sensors, ultrasonic sensors, audio sensors (e.g., microphones), motion sensors, proximity sensors, inertial measurement sensors (e.g., accelerometers, gyroscopes, inertial measurement units), temperature sensors, chemical sensors, biological sensors, odometers (e.g., wheel odometers), and so on. The sensors 106 can be arranged in any suitable configuration, as described in further detail below.

The data received from the sensors 106 can be processed by the processing module 108 and/or stored within the memory 110. The processed sensor data can be used to inform other functionalities of the ADM 100. For example, data received from vision sensors can be processed by suitable computer vision algorithms so as to perform target identification and tracking, optical character recognition, gesture recognition, pattern recognition, and so on. As another example, data received from GPS sensors, proximity sensors, inertial measurement sensors, and the like can be used to facilitate the autonomous navigation capabilities of the ADM 100, including obstacle detection, self-localization, landmark identification, mapping, and so on. Optionally, some or all of the data collected by the sensors 106 can be transmitted via the communication module 114 to a remote device as described in further detail below.

The controller 112 can be used to control various operational aspects of the ADM 100, such as propulsion, navigation, sensing, data processing, communication and the like. The controller 112 may generate commands in a wholly operated manner such that the ADM 100 can operate independently of any user input. Alternatively, the controller 112 can generate commands partially or wholly based on user input. Such input may be entered directly into the ADM 100 (e.g., via a suitable input interface) or received from via the communication module 114.

The communication module 114 can enable the ADM 100 to communicate with a separate device (e.g., computer, laptop, tablet, mobile device, another ADM, etc.), which may be physically remote from the ADM 100. For example, such a device may be a personal device of a user. Alternatively, the device may be located at a control center. The communication module 114 can implement any suitable wired or wireless communication method. A wireless communication method can transmit data using electromagnetic waves, sound waves, radio waves, or light. Exemplary wireless communication methods suitable for use with the embodiments provided herein include WiFi, mobile phone networks, satellite communications, telecommunication networks, and so on. Such communication methods may be long range or short range methods. Optionally, a communication method may require line of sight, or may be line of sight independent. The communication module 114 can include suitable receivers, transmitters, and/or transceivers for communicating various types of data. For example, the communication module 114 can transmit data relating to a state of the ADM 100 (e.g., location, status), as well as data obtained by the ADM (e.g., sensor data from the sensors 106). Conversely, the communication module 114 can receive data from a separate device, such as user commands and instructions. In some instances, wireless security may be provided that may prevent or reduce the likelihood of hacking or interception of data (e.g., information, commands, instructions). For instance, encryption techniques may be utilized to protect communications.

The power supply 116, which may be a battery, fuel cell, or any other type of portable power source, can be used to power the propulsion system and the functional modules of the ADM 100. In some embodiments, the power supply 116 is selected to enable prolonged operation of the ADM 100 without requiring recharging or power supply exchange. A local power source of the ADM may be renewed or recharged as needed. In some instances, recharging stations may be provided at an area that is monitored by the ADM, such as a parking area. In some instances, a single ADM or multiple ADMs may coordinate motions to monitor the area while recharging as needed.

As previously discussed, the ADMs provided herein can include any suitable number, type, and combination of sensors. The sensors of an ADM can be situated on any suitable portion of the ADM, such as on, within, or outside of the housing, as well as near the top, bottom, or sides of the ADM. In some instances, the sensor arrangement can be determined based on specific tasks to be performed by the ADM. For example, an ADM utilized for monitoring parking areas, such as the embodiments provided herein, can include sensors selected and arranged for detecting parking space boundaries, identifying vehicle characteristics, obtaining license plate information, and the like.

Figure 1B:
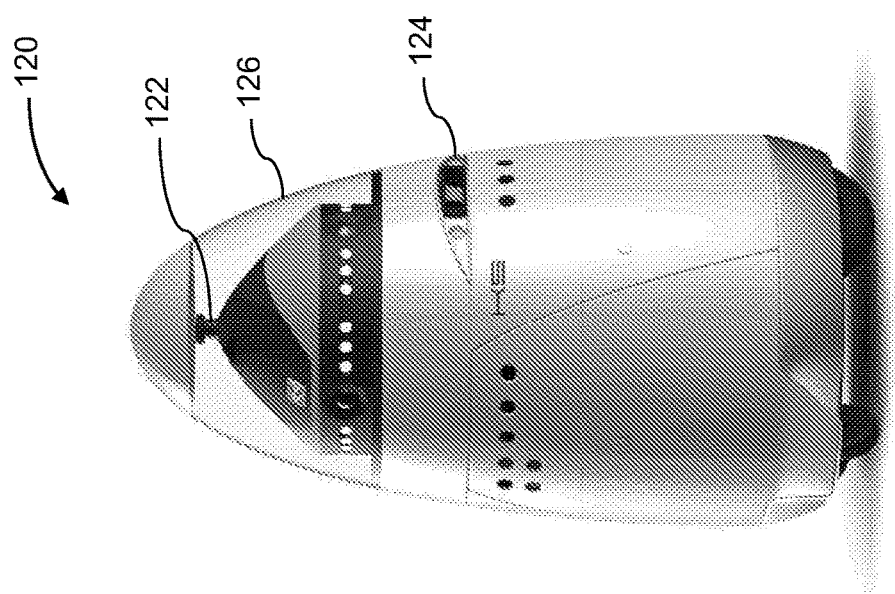
FIGS. 1B and 1C illustrate autonomous data machines having multiple sensors for monitoring a parking area, in accordance with embodiments.

FIG. 1B illustrates an ADM 120 having multiple sensors for monitoring a parking area, in accordance with embodiments. The ADM 120 can include one or more lidar sensors 122 and one or more license plate information sensors 124.

The lidar sensors 122 can be used to detect the presence of objects near the ADM 120 (e.g., for obstacle avoidance and navigation, for determining parking space occupancy, etc.). The lidar sensors 122 can be positioned on the ADM 120 so as to cover one or more different directions relative to the ADM 120, such as forward, backwards, upwards, downwards, to the left, or the right. The lidar sensors 122 can be oriented horizontally, vertically, or at an intermediate angle relative to the ADM 120 so as to provide the appropriate coverage. For example, at least one lidar sensor 122 can be situated near the upper end of the ADM 120, optionally within a housing 126. The housing may optionally be transparent, or may be opaque. The lidar sensor 122 may be rotatable relative to the ADM housing 126 so as to enable an approximately 360° field of view. Alternatively, the lidar sensor 122 may be in a fixed position and/or orientation relative to the housing 126. In some embodiments, a plurality of lidar sensors 122 can be used, such as to enable panoramic obstacle detection without necessitating movement of the lidar sensors 122. In some instances, one or more lidar sensors may be provided outside a housing, or a housing may not be provided. In some embodiments, one or more Velodyne lidar sensors may be utilized. A sensor (e.g., Velodyne lidar sensor) may be capable of detecting over a 360 degree field of view. Any of the sensors of the ADM may be arranged in any manner that may provide appropriate coverage. The various sensors may cover a 360 degree field of view and/or may be provided with different angles or fields of coverage. The sensors may be angled to have different heights of coverage. In some instances, the sensors may be configured to collect license plate information. The sensors may be configured to accommodate license plates located on different portions of vehicles or at different heights of vehicles.

License plate detection can include any combination of sensors suitable for collecting information relating to a vehicle license plate. License plate information may include: alphanumeric characters, signs, or symbols (e.g., a code serving as an identifier for the vehicle); information on the state and/or country of a license plate; image data (e.g., photographs, videos) of the license plate; registration information (e.g., provided by a registration sticker or tag attached to the license plate); state of the license plate (e.g., California, New York); specialty plates (e.g., vanity plates, diplomatic plates, government plates, handicapped plates); time when the license plate information is collected; and location of license plate (e.g., GPS coordinates). License plate information can also include information relating to the vehicle to which the license plate is affixed (e.g., make, model, color, image of the vehicle, etc.). In some embodiments, license plate detection can include a combination of optical sensors for detecting visible and infrared light, as well as visible and/or infrared illumination sources. One or more sensors can detect license plate information based on differences in reflection of infrared and/or visible light from various portions of the license plate. In some instances, a license plate may have locally varying coatings (e.g., an infrared reflective coating) that enable detection of signs, characters, symbols, or other features of the license plate using one or more sensors.

In some instances, sensors used for license plate detection may be dedicated solely to license plate detection. Alternatively, sensors used for license plate detection can be used for other functions as well, such as navigation or obstacle avoidance. In some instances, third party automated license plate recognition systems may be utilized. Alternatively, ADM or an external device (e.g., control center, server, etc.) in communication with the ADM may be capable of license plate detection. Any description herein of license plate information sensors may apply to any type of sensor that may be used for license plate detection. License plate information sensors may be the same as or provided in addition to any other type of sensor described herein. In some embodiments, cameras may be used for license plate detection. For example, one, two, three, four, five, six or more cameras may be positioned on the ADM. The cameras may collectively capture at least 90 degrees, 180 degrees, 270 degrees, or 360 degrees around the ADM. The cameras may be HD cameras capable of capturing high definition images. The images from the cameras may be analyzed to provide automated license plate recognition.

Any suitable number and combination of license plate information sensors 124 can be used, such as one, two, three, four, five, six, or more sensors. The sensors 124 can be situated on the same portion of the ADM 120. For example, FIG. 1B depicts a single license plate information sensor 124 situated on the front of the ADM 120. Alternatively, the sensors 124 can be arranged on different locations of the ADM 120 (e.g., up to one, two, three, four, five, or six different locations) so as to cover different viewing angles and conditions. For example, some sensors may be arranged on or near the perimeter of the ADM 120 (e.g., on the housing 126) at 0°, 90°, 180°, and/or 270° relative to the front (e.g., the direction of forward motion) of the ADM 120. The position and/or orientation of one or more sensors on the ADM 120 (e.g., height) may correspond to the expected position and/or orientation of a license plate on a vehicle. The use of multiple combinations and arrangements of license plate information sensors 124 permits detection of license plate information on multiple cars for a single scanning run of the ADM 120, such as license plates of vehicles parked to the left or right sides of the path traveled by the ADM 120.

Figure 1C:
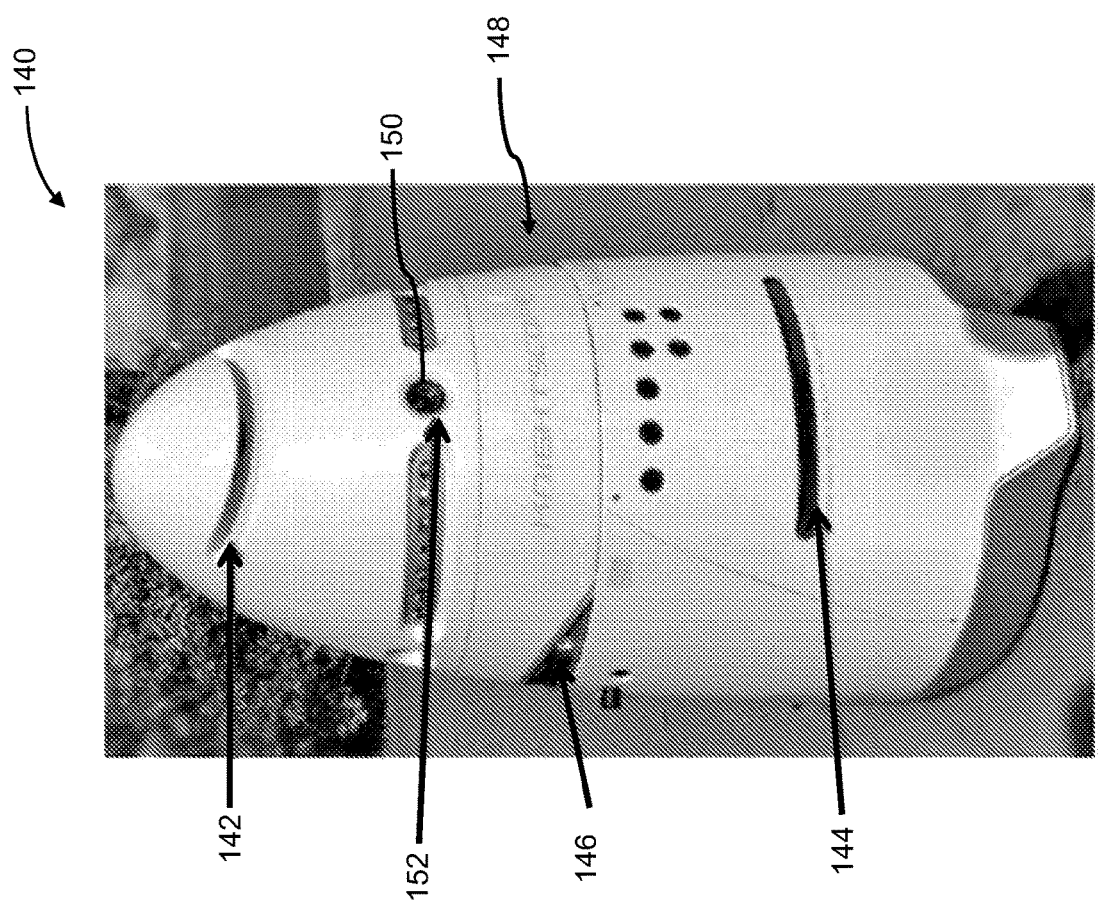

FIG. 1C illustrates an ADM 140 having multiple sensors for monitoring a parking area, in accordance with embodiments. The ADM 140 can include a plurality of sensors, such as lidar sensors 142, 144, one or more cameras 150, 152, or any other sensors 146, 148 (which may optionally be useful for license plate detection or other functions). As previously mentioned, the lidar sensors 142, 144 can be oriented in any suitable manner. For example, the lidar sensors can include a downward-scanning lidar sensor 142 and a horizontal-scanning lidar sensor 144. Optionally, one or more lidar sensors may have multiple scanning beams in different directions and/or angles (e.g., Velodyne sensors). Similarly, various sensors 146, 148 can be positioned and/or oriented on the ADM 140 in any suitable configuration. For example, the various sensors can include a first sensor 146 and a second sensor 148 positioned on opposite sides of the ADM 140 so as to provide lateral scanning capabilities. Optionally, one or more of these sensors may be useful for license plate detection. Alternatively or in addition, the ADM 140 can include a plurality of cameras 150, 152 suitable for capturing visual information regarding the surroundings of the ADM 140. The cameras 150, 152 can be adapted to measure visible light, infrared light, ultraviolet light, or suitable combinations thereof. Any suitable number of cameras can be used, such as one, two, three, four, five, or more cameras. The cameras may or may not be used for license plate detection. Similar to the other sensor described herein, the cameras can be positioned and/or oriented on the ADM 140 in any suitable configuration. For example, the ADM 140 can include multiple cameras positioned at equal intervals around the circumference of the ADM 140, thereby providing panoramic vision of the environment surrounding the ADM 140.

The ADMs described herein can be employed to monitor various types of parking areas. A parking area can be any suitable location having one or more parking spaces (also referred to herein as "parking spots") for parking vehicles, such as a parking lot, parking garage, street parking, temporary parking, and so on. A parking area may accommodate various types of vehicles, such as cars, trucks, large trucks, buses, motorcycles, scooters, bicycles, and the like. Some parking areas may be designed to accommodate a single type of vehicle (e.g., only motor vehicles, only cars, only motorcycles) while other parking areas can be used to accommodate multiple vehicle types (e.g., car and motorcycle parking). The boundaries of each parking space within a parking area may be delineated by suitable markers, such as visual markers (e.g., painted lines, reflective strips), physical markers (e.g., curbs, bumpers, dividers), or suitable combinations thereof. In some instances, boundaries of parking spaces within a parking area may not be visible. For example, a parking area may be a field or unmarked curb, where cars may park without visible boundaries. Optionally, a parking space may include signs or other types of labels indicating various types of information associated with the space, such identifiers for the space (e.g., alphanumeric characters) or any restrictions that pertain to the space (e.g., handicapped parking, vehicle type restrictions, time limits, customers only, permit only, etc.). Identifiers for the space may be located on the ground, on a post, on a curb, or any other location. The identifiers may be visually detectable or may include a wireless signal. The size and geometry of a parking space may depend on the vehicle type that it is designed for. For instances, a parking space for a motorcycle may be smaller than a parking space for a car. Some types of parking spaces may be suitable for multiple types of vehicles (e.g., cars and motorcycles, while other types of parking spaces may be designed for a single vehicle type. Furthermore, the geometry of the parking spaces may dictate the parking arrangement permitted in the parking area, such as perpendicular parking, parallel parking, angle parking, head-in parking, double parking, or suitable combinations thereof. The parking spaces within a parking area may be arranged in a single row or in a plurality of rows. In some instances, the parking spaces may be distributed across multiple levels (e.g., in a multi-level parking garage, stacked parking).

An ADM can be deployed in a parking area to collect various types of information related to the parking area, which may be referred to herein as "parking information." For example, the ADM can be used to collect license plate information for license plates of vehicles parked in the parking area, such as by using one or more license plate information sensors (e.g., cameras) as described above. An ADM may navigate an area in accordance with a predetermined path. Alternatively, the ADM may follow a randomized path. In some instances, an ADM may alter its path if it detects a condition of interest. Optionally, an ADM may randomly wander until an ADM detects an incident of interest. In some instances, the ADM may autonomously monitor the area in accordance with one or more parameters (e.g., area to cover, how frequently each parking space should be visited, etc.). The ADM may navigate a region in accordance with data collected from one or more sensors. For instance, GPS coordinates may be utilized. Optionally, visual markers and/or IMU data may be utilized to navigate a region. Simultaneous localization and mapping (SLAM) navigation may be used.

In some embodiments, an ADM can autonomously navigate within a parking area in order to: detect and read license plates of vehicles; communicate the license plate information to a remote entity (e.g., a security operations center, control center, parking lot management center, user device); and compare the collected license plate information to other information (e.g., a list or database of known license plates). As another example, the ADM can collect vehicle information for vehicles parked within the parking area, such as information regarding vehicle type, make, model, color, images of the vehicle, or any other relevant identifiers for the vehicle. Optionally, vehicle information may include information regarding a state of the vehicle, such as whether the vehicle is on, off, stationary, in motion, etc. Vehicle state may be determined based on information regarding individual vehicle components (e.g., image data indicating whether headlights and/or taillights are on or off; audio data or thermal imaging data indicating whether the engine is on or off). Vehicle occupancy and/or activity information may be collected (e.g., individual getting into a vehicle or out of a vehicle, individual loading or unloading a vehicle, individual breaking into a vehicle, individual sitting in a vehicle). Optionally, damage to a vehicle may be recognized. Similar to the license plate information described above, the vehicle information can be transmitted to a remote entity and/or compared to other information (e.g., a list or database of known vehicles).

Furthermore, an ADM can autonomously navigate within a parking area so as to collect information relating to one or more parking spaces within the parking area, such the location of the parking space (e.g., GPS coordinates), size of the parking space, type or layout of the parking space, images of the parking space, the time when the parking space information was collected, and occupancy information for the parking space. Occupancy information may include: information regarding whether a parking space is occupied; the time the parking space was occupied or unoccupied; and information relating to a vehicle occupying the parking space (e.g., make, model, color, image, license plate, type). Parking space information collected by the ADM may include information relating to any signs, markings, symbols, or other indicators associated with the parking space, which may indicate rules or restrictions for the parking space (e.g., time limits, permit parking, customer parking, handicapped parking, carpool parking, vehicle type restrictions, etc.). In some instances, parking space information may be used to facilitate the collection of other types of information. For example, information regarding the size of a parking space can be used to determine what types of vehicles may be capable of fitting within the parking space.

Figure 2A:
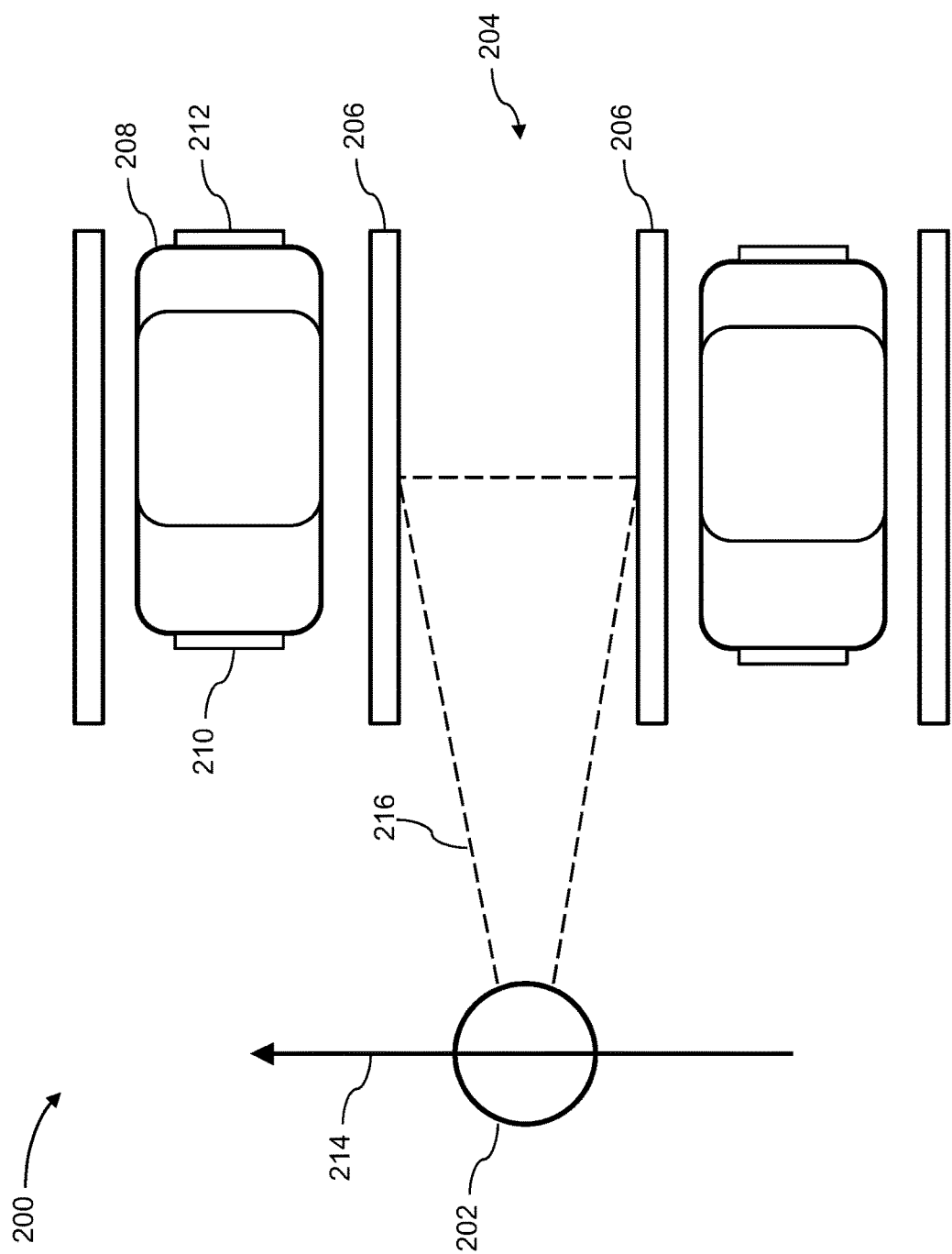
FIG. 2A illustrates a parking area monitored by an autonomous data machine, in accordance with embodiments.

FIG. 2A illustrates a parking area 200 monitored by an ADM 202, in accordance with embodiments. The parking area 200 can include a row of parking spaces 204, each delineated by boundary markers (e.g., painted lines 206). The parking area 200 is depicted herein as accommodating a single row of perpendicular parking, although other types of parking arrangements can also be used. Some of the parking spaces 204 of the parking system 200 are occupied by vehicles, such as a parked car 208. Each of the vehicles may have at least one license plate, such as a front license plate 210 and/or a rear license plate 212.

The ADM 202 can navigate within the parking area 200 near the parking spaces 204 along a movement path, represented herein by the arrow 214. The movement path may be a planned movement trajectory for the ADM 202 along up to six degrees of freedom of motion (e.g., three degrees of translation, three degrees of rotation). The movement path may be determined autonomously, semi-autonomously, or based on input commands from a user. The geometry and location of the movement path of the ADM 202 may be determined based on various parameters, such as the type of parking arrangement used in the parking area 200, the size and/or shape of the parking spaces 204, the expected locations of the vehicles and/or license plates within the parking spaces 204, and the spaces within the parking area 200 available for vehicle navigation. For example, the movement path may start at the first parking space of the row 204 and end at the last parking space of the row 204. In some embodiments, the movement path can be a loop, which may be traveled repeatedly by the ADM 202 at a specified frequency so as to provide periodic updates to the parking information obtained from the parking area 200.

The spatial relationship between the movement path and the parked vehicles may depend on the particular parking arrangement used in the parking area. For example, due to the perpendicular parking arrangement of the parking area 200, the movement path of the ADM 202 may be perpendicular or approximately perpendicular to the orientation of the parked vehicles. The movement path may be parallel or approximately parallel to the row of parking spaces 204, such that the field of view 216 of one or more sensors of the ADM 202 sweeps each vehicle and parking space within the row 204 as the ADM 202 travels along the movement path. The field of view 216 may be perpendicular or approximately perpendicular to the movement path 214. In some embodiments, the distance between the movement path and the row of parking spaces 204 can be determined based on the range of the sensors of the ADM 202, to ensure that the field of view 216 can capture the desired information. For instance, the distance can be within the range of 1 m to 15 m relative to the parking spaces 204, or relative to the expected locations of the vehicles and/or license plates within the parking space 204.

In some embodiments, the ADM 202 can be designed to avoid potential collisions or obstructing vehicles when navigating within the parking area 200. Suitable collision detection mechanisms may utilize various obstacle detection sensors, such as lidar sensors, ultrasonic sensors, thermal sensors, infrared sensors, vision sensors. Furthermore, the ADM 202 can include one or more audio sensors capable of detecting multiple audio signals that may be produced by a vehicle (e.g., honking, bicycle bells, emergency vehicle signals, honking, engine noises, sounds from a radio or speaker system, car doors opening or closing) or a human (e.g., speaking, shouting) and that may be indicative of a potential collision. The audio signals may be analyzed to determine whether a car is entering or exiting an audio detection zone. For example, a sound of a car starting may suggest that a car is leaving. A sound of an engine gradually increasing may suggest that the car is gradually entering. For example, a car honking may indicate that the ADM 202 is obstructing the path of a car within the parking area 200. As another example, the detection of car engine sounds may indicate that a car is about to enter or exit a parking space. In some embodiments, the potential collision and/or obstruction situation detected by the audio sensors can be verified using the other sensors of the ADM 202. The ADM 202 can then adjust its motion as needed to avoid colliding with and/or obstructing the vehicle or human. For example, upon detecting a siren indicative of an oncoming emergency vehicle, the ADM 202 can maneuver to clear a path for the emergency vehicle (e.g., move to the side of the driving lane), and can return to its original motion path once the emergency vehicle has passed. In some embodiments, visual signals or infrared signals may be similarly useful for detecting potential collision or a need to take evasive action. For instance, rear back up lights on a vehicle may be recognized by the ADM, and allow the ADM to take evasive action. In another example, such as flashing lights from emergency vehicles, may be detectable and useful for indicating when an ADM may need to take action to avoid collision.

Figure 2B:
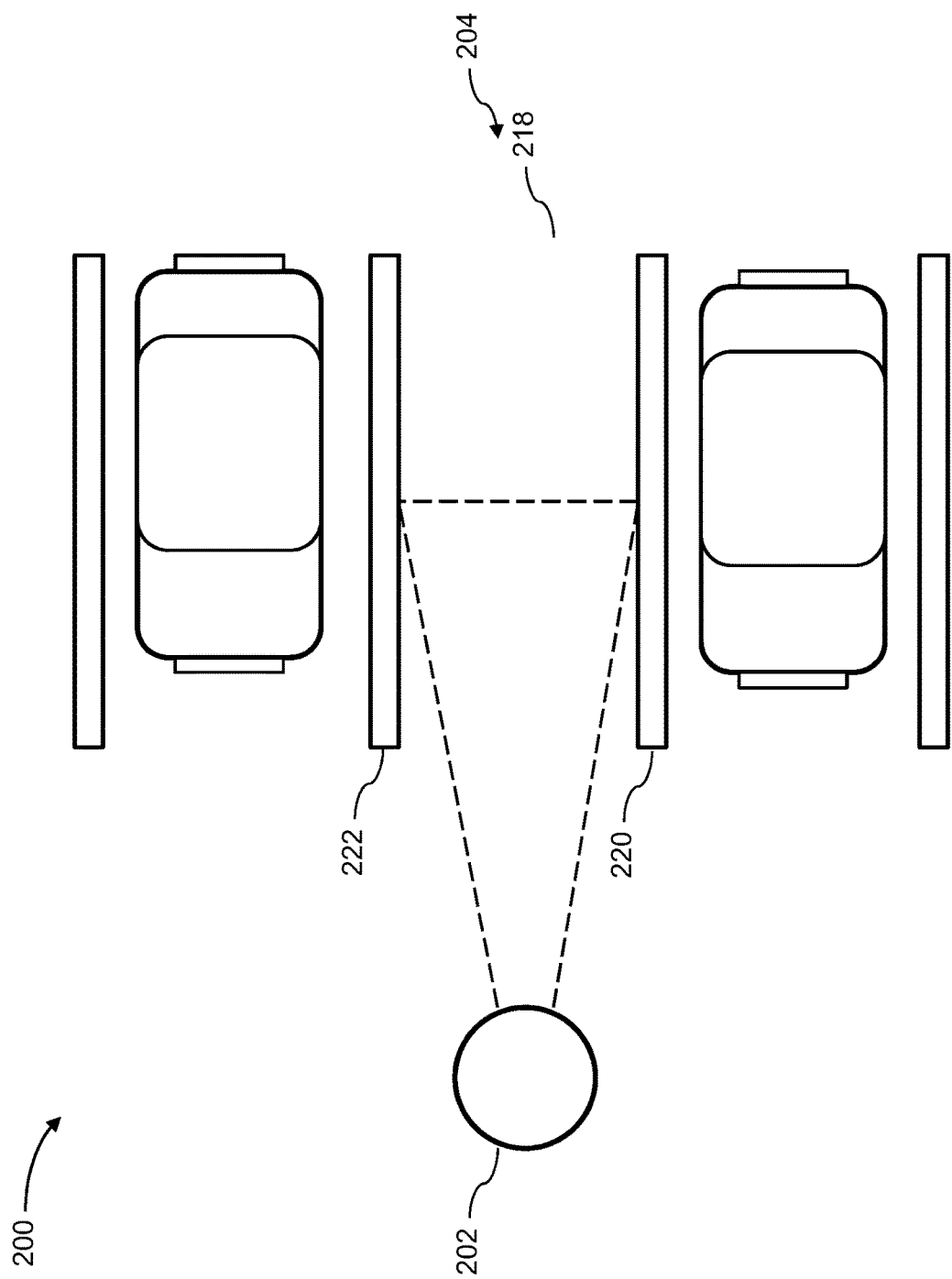
FIG. 2B illustrates an autonomous data machine obtaining parking information, in accordance with embodiments.

FIG. 2B illustrates the ADM 202 obtaining parking information for a parking space 218 within the row 204, in accordance with embodiments. The occupancy of the parking space 218 can be determined using sensor data from one or more on-board sensors of the ADM 202, including lidar sensors, cameras, thermal cameras, infrared cameras, license plate information sensors, and the like. The lidar sensors can be used to detect the exterior of a vehicle. The cameras can be used to determine the specific shape of the vehicle. The thermal cameras and/or infrared cameras can be used to determine the specific shape and/or thermal signature of the vehicle. The sensing data from multiple sensors can be processed by suitable methods (e.g., machine vision algorithms, pattern recognition algorithms, etc.) to determine whether the parking space 218 is occupied, and, if it is occupied, the characteristics of the occupying vehicle, as described in further detail below. Occupancy may be determined based on various detected characteristics indicative of the presence of a vehicle, such as an object size and/or shape, thermal signature, object position and/or orientation relative to the parking boundaries, and so on.

In some embodiments, the detection of occupancy information may be based on information regarding the expected location of a vehicle within the boundary markers of the parking space 218. This information can be provided to the ADM 202 (e.g., transmitted by a remote device), stored on the ADM 202 (e.g., on an on-board memory, provided as pre-programmed or hard-coded instructions), obtained by the ADM 202 as it navigates the parking area (e.g., using one or more sensors), or suitable combinations thereof. For example, the specific characteristics of the parking area 200 can be provided to the ADM 202 by a user, such as by control center personnel. As another example, the ADM 202 can determine the specific parking arrangement for the parking area 200 using suitable sensor data (e.g., camera data) and thereby determine how vehicles should be parked within the parking area 200.

The expected location information may correspond to a default location for the vehicle (e.g., parked entirely between the boundary markers approximately equidistant from each marker). The expected location may be used to define the boundaries of an occupancy scan performed by the ADM 202 for each parking space. For example, the ADM 202 may begin its occupancy scan of the parking space 218 upon detecting a first boundary marker 220, and may end its sweep upon detecting a second boundary marker 222. Optionally, the occupancy scan may begin and end at specified locations relative to the first and second boundary markers 220, 222. For example, the scan may begin in the interior of the parking space approximately 0.1 m to approximately 0.5 m from the first boundary marker, and may end in the interior of the parking space approximately 0.1 m to approximately 0.5 m from the second boundary marker. This approach may be beneficial to avoid erroneous detection of occupancy information for parking spaces surrounding the parking space 218.

Furthermore, the accuracy of the occupancy information can be improved by combination with other sensing results (e.g., license plate information) and/or with information regarding the parking space 218 and/or parking area 200 (e.g., the vehicle type for the parking space, the parking arrangement, etc.). For example, if the ADM 202 detects a vehicle and is able to detect license plate information for the vehicle, the occupancy of the parking space 218 may be confirmed. If the ADM 202 does not detect a vehicle and is unable to sense license plate information, the vacancy of the parking space 218 may be confirmed. If the ADM 202 detects a vehicle without sensing license plate information, or vice-versa, the parking space 218 may possibly be occupied. As another example, if the ADM 202 is provided with information that the parking space 218 is a motorcycle parking space, and the ADM 202 detects a small vehicle within the parking space 218, then it may be confirmed that the occupying vehicle is a motorcycle.

Figure 2C:
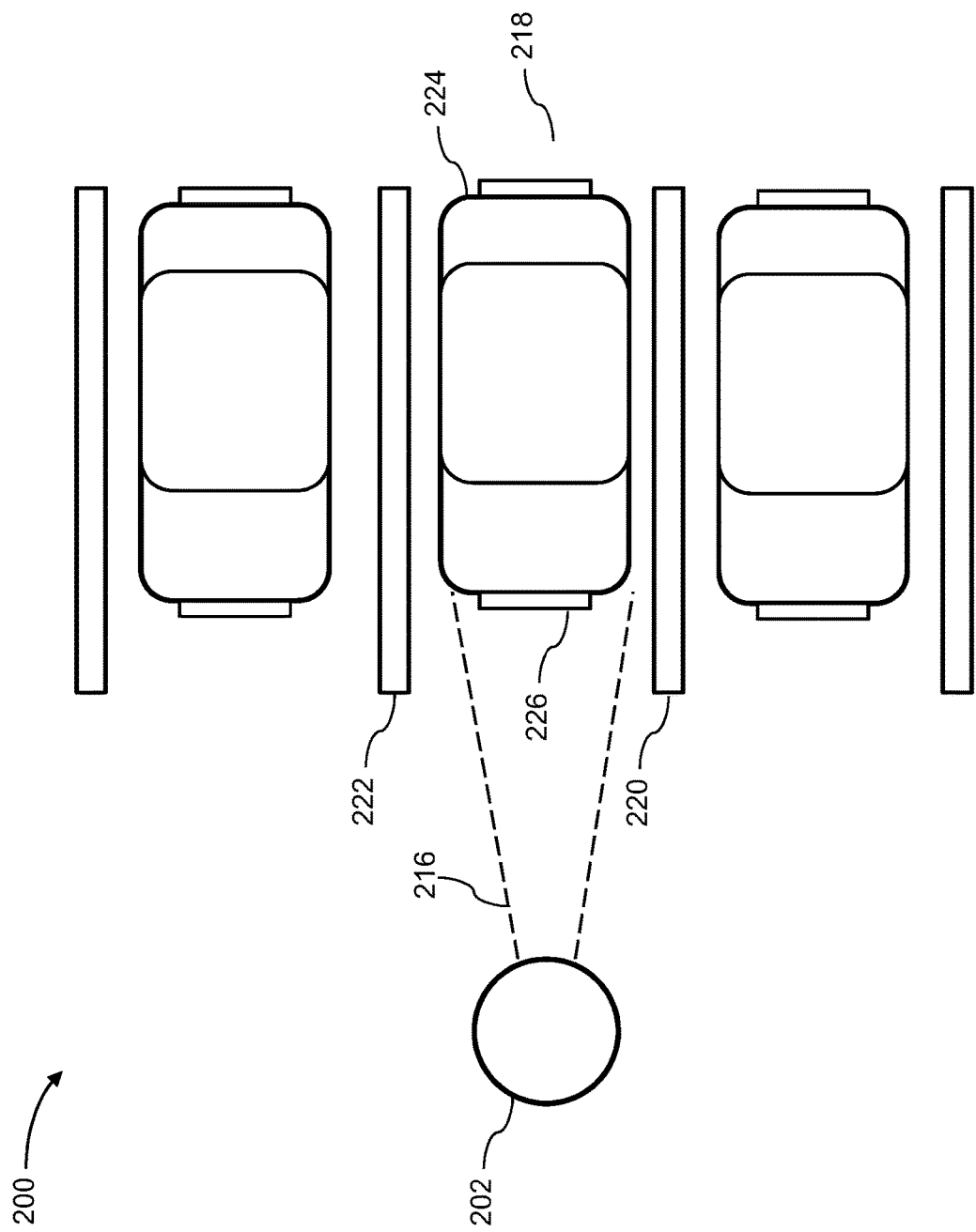
FIG. 2C illustrates an autonomous data machine obtaining vehicle and license plate information, in accordance with embodiments.

FIG. 2C illustrates the ADM 202 obtaining vehicle and license plate information from a vehicle 224 having a license plate 226, in accordance with embodiments. As previously described, the vehicle information (e.g., type, make, model, color, etc.) can be obtained using one or more sensors (e.g., vision sensors, infrared sensors, lidar sensors, thermal sensors, etc.), and the license plate information can be obtained using one or more license plate readers. The boundaries of the scan performed by the ADM 202 may be determined based on information regarding the expected location of the vehicle 224 and/or license plate 226, so as to improve detection performance and avoid scanning information from a vehicle and/or license plate different from the intended target. The expected location of a license plate 226 may be provided relative to the parking area 200 or parking space 218 (e.g., relative to the ground, to boundary markers 220, 222) relative to the vehicle 224 (e.g., near the middle of the front end of the vehicle 226), or suitable combinations thereof. This information can be provided to the ADM 202, stored on the ADM 202, and/or obtained by the ADM 202. As previously mentioned, the expected location of the vehicle 224 within the parking space 218 may be provided as a range relative to the boundary markers 220, 222 (e.g., between the markers 220, 222 at a distance of approximately 0.1 m to approximately 0.5 m from each marker). In some embodiments, the ADM 202 can be provided with information regarding an expected position of a license plate relative to the ground and/or the vehicle. For example, the ADM 202 may scan for the license plate at a height of approximately 0.5 m to approximately 1.5 m above the surface of the ground, and on the end of the vehicle at a distance of approximately 0.5 m to approximately 1.5 m from the left or right outer sides of the vehicle.

In some embodiments, information regarding the current spatial disposition and/or motion path of the ADM 202 can be used to determine the expected location of the vehicle 224 and/or license plate 226. This information can be detected using suitable position, orientation, and/or motion sensors carried by the ADM 202, such as lidar sensors, inertial sensors, odometers, GPS sensors, and so on. In some instances, the motion path and/or spatial disposition of the ADM 202 may influence the expected relative location of the vehicle 224 and/or license plate 226. Some examples of circumstances which may alter the expected spatial relationship between the ADM 202 and the vehicle 224 and/or license plate 226 include: variations in the surface that the ADM 202 is traveling on (e.g., depressions, pot holes, speed bumps, small rocks, etc); one or more obstacles in the movement path of the ADM 202 causing the ADM 202 to perform evasive maneuvers (e.g., alter the movement path); and the ADM 202 passing the top of a hill or the bottom of a depression. The ADM 202 can use information regarding its current spatial disposition and/or motion path to compensate for an altered spatial relationship, such as by modifying the scanning direction of its sensors. For example, if the ADM 202 detects that it will temporarily deviate from its path by +5° to avoid an obstacle, the expected location of the license plate information for a vehicle relative to the license plate information sensor can be corrected by a corresponding angle, such as by −5°. This approach may reduce the probability of the ADM 202 unintentionally capturing data from a parking space other than the intended parking space 218.

The ADM 202 can be adapted to detect an obstructed, unreadable, or missing license plate. For example, a license plate may be temporarily blocked from the field of view 216 of the ADM 202 by another object, such as a human (e.g., pedestrians, bicyclists) or another vehicle. The obstructing object may be a dynamic object or a stationary object. The ADM 202 can detect the presence of an obstructing object by combining information regarding the expected location of the vehicle 224 and/or license plate 226 relative to the boundary markers 220, 222 with detection and tracking information for obstructing objects to determine that the visibility of the license plate 226 is blocked. The ADM 202 can store the information that the parking space 218 is occupied but that the license plate 226 cannot be read because of an obstruction. The ADM 202 can alter its movement path within the parking area 200 to rescan the license plate 226 in the parking space 218 at a later time, when the obstruction presumably will no longer be present.

As another example, a license plate may be damaged, dirty, missing, or otherwise unreadable by the license plate information sensors of the ADM 202. The ADM 202 may detect this situation by combining information regarding the expected location of the vehicle 224 and/or license plate 226 relative to the boundary markers 220, 222 with information indicating the physical presence of the vehicle 224 (e.g., from lidar sensor data). In such instances, the ADM 202 may be able to detect the vehicle 224 but may not be able to form an intelligible reading of the license plate 226. Consequently, the ADM 202 can store information indicating that the parking space 218 is occupied by a vehicle 224, but that the license plate information cannot be detected.

Figure 2D:
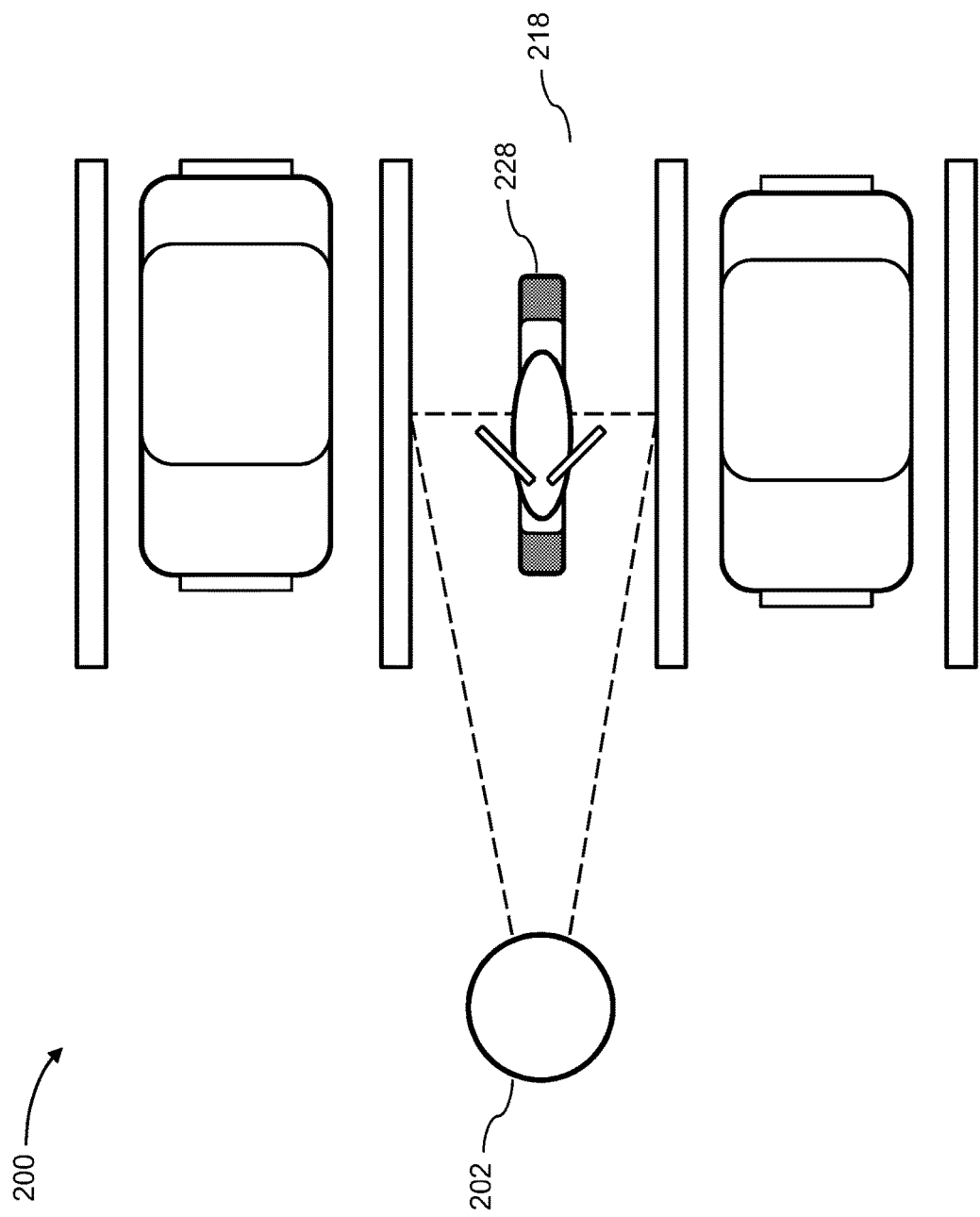
FIG. 2D illustrates an autonomous data machine detecting a vehicle of a different type, in accordance with embodiments.

FIG. 2D illustrates the ADM 202 detecting a vehicle 228 of a different type within the parking space 218, in accordance with embodiments. The ADM 202 can be configured to identify and distinguish various vehicle types. In some embodiments, the ADM 202 can use information indicating an expected location of a vehicle relative to the boundary markers 220, 222 of the parking space 218, as well as data representing the physical characteristics of the vehicle (e.g., lidar data) to identify whether a vehicle 228 having a different type than the designated vehicle type is parked in the parking space 218. For example, FIG. 2D depicts the vehicle 228 as a motorcycle parked within a car parking space.

Examples of a vehicle of a different type parked within a designated parking space may include motorcycles in a car parking space, cars within a bus or van parking space, car within a motorcycle space, or a high occupancy vehicle within a car parking space. Other examples may include regular vehicles parked in electric vehicle or hybrid electrical vehicle parking spaces. One example may be a non-charging vehicle parked in a vehicle charging space. Additional examples may include non-handicap vehicles parked in handicap parking spaces, non expectant mothers parked within expectant mother parking spaces, residents or employees parking within a visitor parking space, non-employees parking within an employee parking space, non-residents parking in a resident parking space, a non-executive parking within an executive parking space, or a non-carpool vehicle parking within a carpool space. A vehicle of a different type within a designated parking space may include any type of vehicle (or driver of the vehicle) that is not of the category for whom the parking space is reserved.

The vehicle may be recognized as being of a different type than a designation of a parking space. As previously mentioned, the vehicle may be recognized based on vehicle positioning and/or size. For instance, the position of the vehicle relative to the boundary markers may be used to recognize whether the vehicle is of a different type. In some instances, overall physical characteristics of the vehicle such as size, dimensions, or shape may be used to recognize whether the vehicle is of a different type. In some instances, a marker on the vehicle or the license plate may be detected to recognize whether the vehicle is of a different type or the same type from the designation of a parking space. For example, a handicapped driver may have a handicap symbol on the license plate, or a placard or sticker on the vehicle. In some instances, a vehicle may have a visible visitor's pass, employee sticker, resident sticker, executive sticker, carpool sticker, or other type of visible indicator of the vehicle and/or driver type or status. An electric vehicle, hybrid electric vehicle, or other clean-air vehicle may be recognized based on a sticker on the vehicle, or based on the make and/or model of the vehicle. In some embodiments, the license plate information may be used to detect whether the vehicle is the same or of a different type than a designation for the parking space. For instance, a vehicle may be registered with information about the vehicle or driver. The information about the vehicle or driver may include vehicle type (e.g., make or model, categorization, whether the vehicle is an electric vehicle or other type of clean energy vehicle, high occupancy vehicle) or driver information (e.g., whether the driver or passenger is handicapped, an expectant mother, an employee, a resident, a carpool driver, an executive, or any other status). When the license plate is recognized, the ADM may access information about the vehicle and/or driver and be able to determine whether the vehicle is of a different type than the parking space designation.

In such instances, the ADM 202 can store information indicating that the parking space 218 is occupied by a different vehicle type. The ADM may also store the license plate information of the vehicle 228. The ADM may provide an alert to an operation center or any other party to indicate that the parking space is occupied by a different vehicle type. The ADM or the operation center may let a party, such as a security system or a parking lot attendant, know that the parking space is occupied by a vehicle of a different type. The vehicle and/or driver may optionally be issued a warning or a fine. The vehicle may or may not be towed.

Optionally, the ADM 202 can be configured to detect when vehicles are moving in or out of parking spaces (e.g., using lidar sensors, motion sensors, etc.), and can store information regarding these parking spaces (e.g., the location). The ADM 202 can adjust its movement path within the parking area 202 so as to repeat the scan of the vehicle and/or license plate of the previously identified parking space, so as to update the information for that space.

The techniques described herein can be applied to various types of parking areas and parking spaces. In some embodiments, information regarding the parking area and/or parking space type can be used to improve the sensing accuracy of the ADM. This information can be provided to the ADM, stored on the ADM, and/or obtained by the ADM as it navigates the parking area. In some embodiments, the type of parking arrangement used in the parking area (e.g., parallel, perpendicular, angle, head-in) can inform the expected orientation of a vehicle within a parking space. Accordingly, the ADM may adjust the position, orientation, scan direction, and/or field of view of its sensors to conform to the expected license plate and/or vehicle orientation and location. This approach may be used to avoid inadvertent capturing of vehicle and/or license plate information from a parking space different from the targeted parking space.

Figure 3:
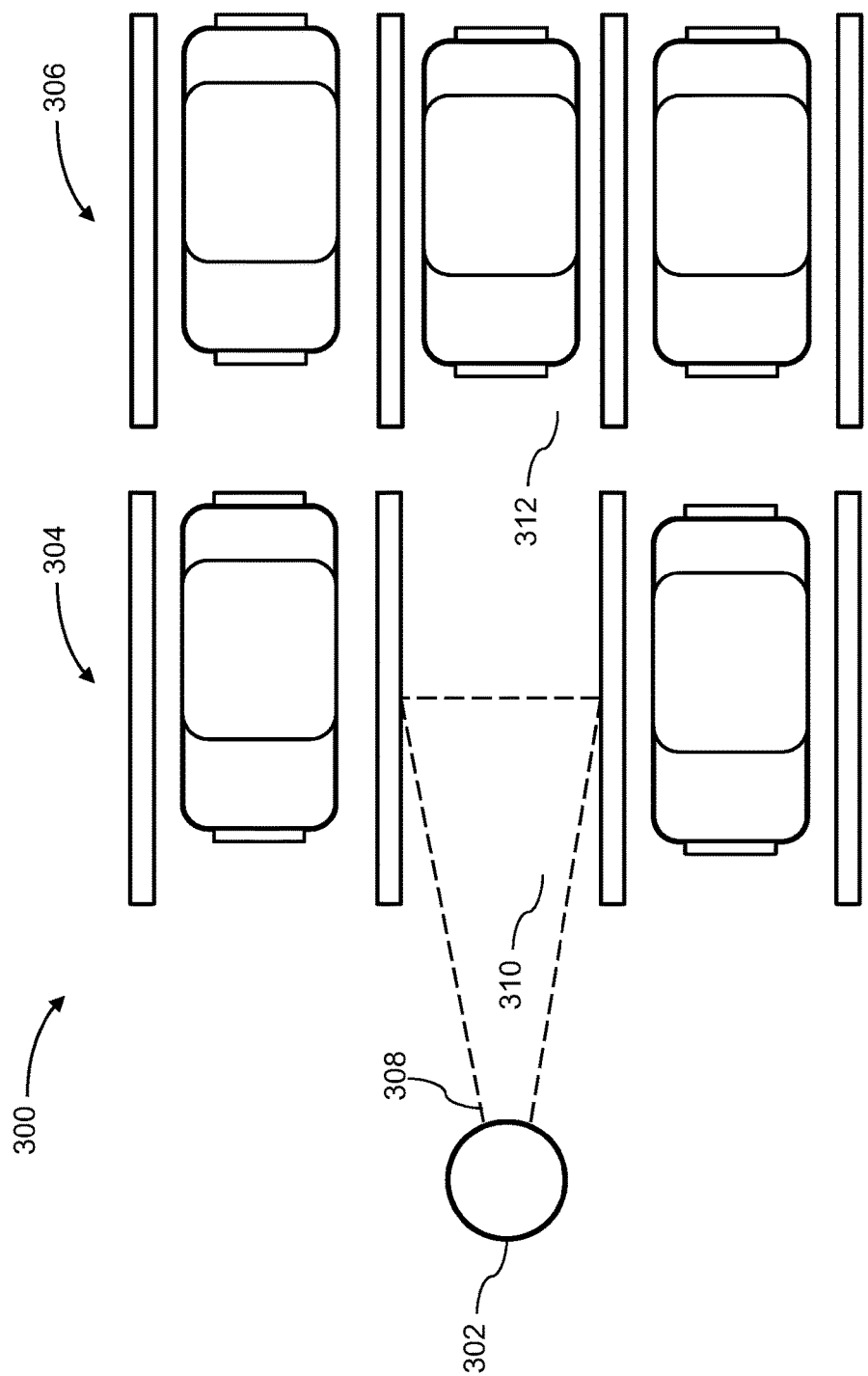
FIG. 3 illustrates an autonomous data machine monitoring a multi-row parking area, in accordance with embodiments.

FIG. 3 illustrates an ADM 302 monitoring a multi-row parking area 300, in accordance with embodiments. The parking area 300 can include a plurality of rows of parking spaces, such as a first row 304 and a second row 306. The field of view 308 of the sensors of the ADM 302 can be adjusted such that, when scanning a parking space 310 in the first row 304, the ADM 302 avoids collecting data from the adjacent parking space 312 in the second row 306. Alternatively or in combination, the ADM 302 can be configured to distinguish a vehicle parked in the parking space 310 of the first row 304 from a vehicle parked in the parking space 312 in the second row 306. This approach may also be helpful for collecting information from parking areas having a double parking arrangement, or any other arrangement in which vehicles are parked in multiple rows or layers.

Figure 4:
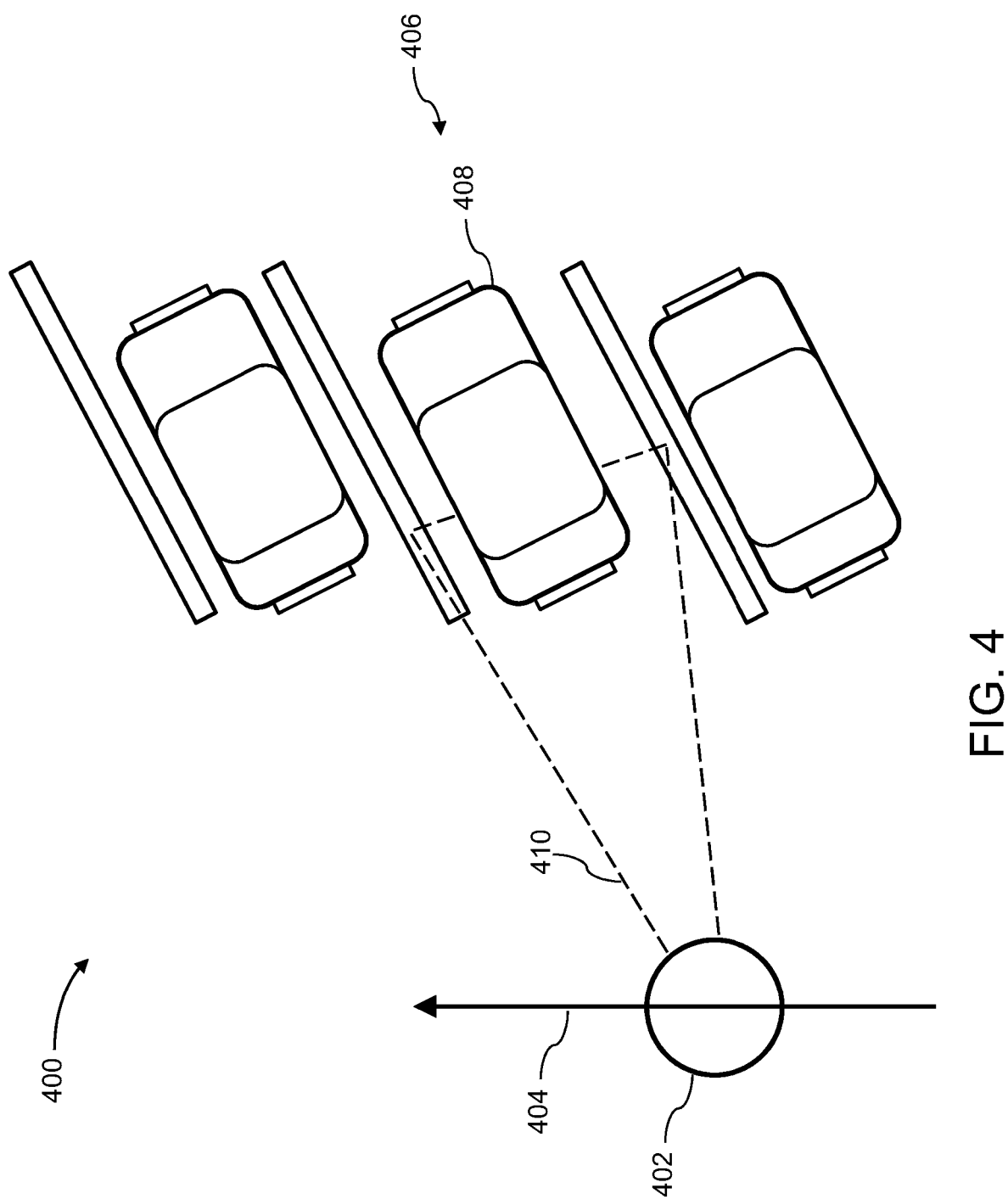
FIG. 4 illustrates an autonomous data machine monitoring an angled parking area, in accordance with embodiments.

FIG. 4 illustrates an ADM 402 monitoring an angled parking area 400, in accordance with embodiments. The ADM 402 can navigate along a movement path (indicated by arrow 404) near a row of angled parking spaces 406. One or more vehicles 408 may be parked within the parking spaces 406. The movement path may be parallel or approximately parallel to the row of parking spaces 406, and may be angled relative to the orientation of the vehicles 408. Optionally, the field of view 410 of the sensors of the ADM 402 may be angled relative to the movement path in a manner corresponding to the angle of the parking spaces 406, so as to improve the detection of the vehicles and/or license plates in the parking spaces 406. The field of view 410 can be angled by altering the orientation of one or more sensors, or by altering the orientation of the ADM 402, for instance. The orientation may be altered by an angle equivalent to or approximately equivalent to the angle of the parking spaces 406. Alternatively, the field of view 410 may not be angled.

Figure 5:
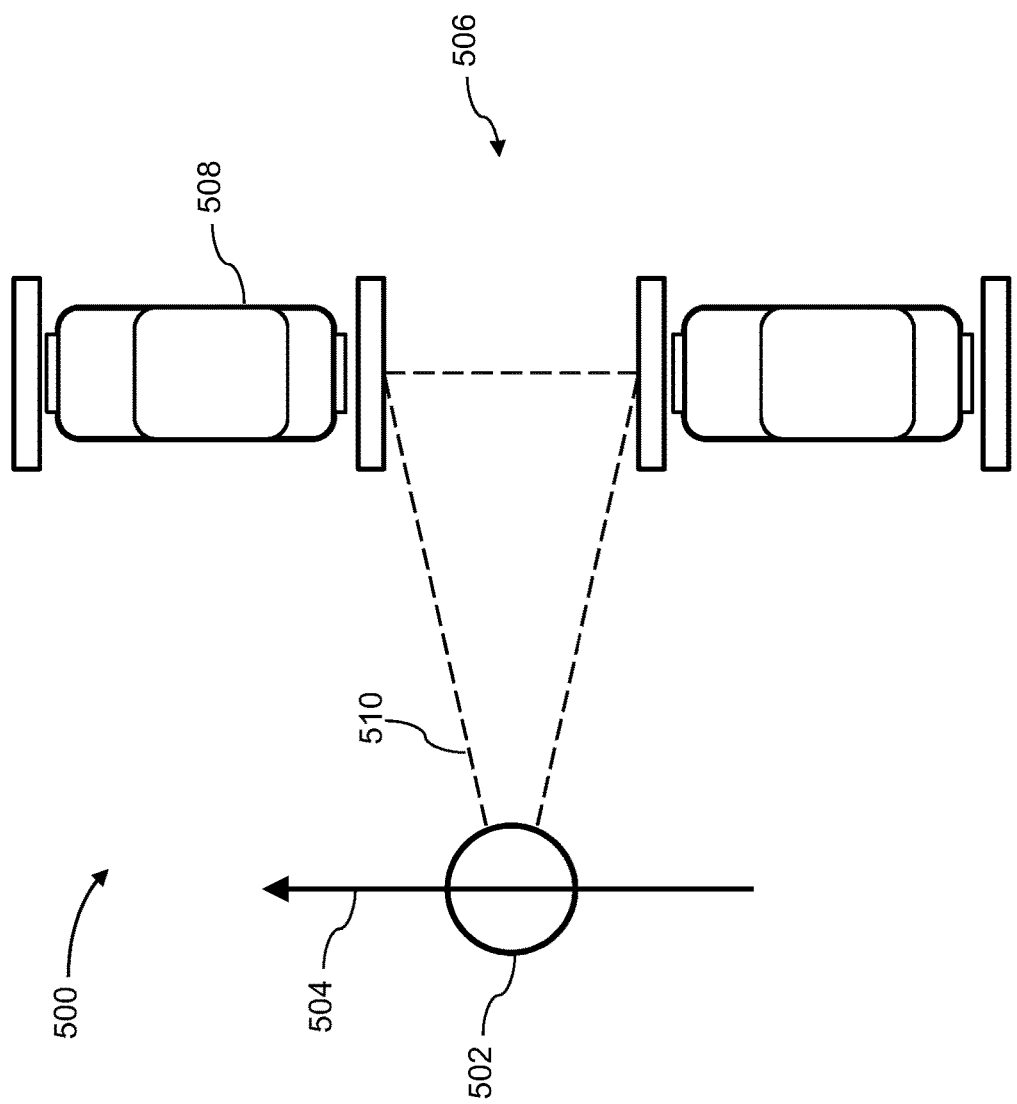
FIG. 5 illustrates an autonomous data machine monitoring a parallel parking area, in accordance with embodiments.

FIG. 5 illustrates an ADM 502 monitoring a parallel parking area 500, in accordance with embodiments. The ADM 502 can navigate along a movement path (indicated by arrow 504) near a row of parallel parking spaces 506. One or more vehicles 508 may be parked within the parking spaces 506. The movement path may be parallel or approximately parallel to the row of parking spaces 506, and may be parallel or approximately parallel to the orientation of the vehicles 508. The field of view 510 of the ADM 502 may be perpendicular or approximately perpendicular to the movement path.

In some embodiments, the ADMs provided herein may be capable of collecting the appropriate parking information even in situations where a vehicle is parked in an unexpected location. For example, a vehicle may be parked at a location in the parking area that is not designated as a parking space, such as a fire lane, no parking zone, in a vehicle traffic lane, and so on. The ADM can determine the presence an illegally parked vehicle (e.g., based on information regarding the location of permissible and impermissible parking areas;

based on information regarding permitted parking times and durations; detecting indicators of illegal parking areas such as signs, symbols, or text), and can store the vehicle and/or license plate information along with information that the vehicle is illegally parked. As another example, a vehicle may be parked in a designated parking area, but may not be parked within the boundaries of a parking space (e.g., on or outside the marked parking lines).

The ADMS may detect a type of parking space and adjust location of the ADM and/or positioning of the sensors accordingly to collect desired information. For instance, the ADM may move to make sure it has a reasonable view of a license plate, if the license plate is hidden or oriented away from it.

FIG. 6 illustrates an ADM 602 monitoring a parking area 600 with vehicles 604 parked outside the parking boundaries 606, in accordance with embodiments. Although the parking area 600 is depicted as having a parallel parking arrangement, the approaches described herein can also be applied to other types of parking arrangements. The vehicles 604 in the parking area 600 may be parked with an offset relative to the parking boundaries 606. In some instances, the amount of the offset may be similar through a consecutive sequence of parked vehicles 604, and may revert to no offset (e.g., parking between the boundaries 606) following a gap in the sequence of parked vehicles. The ADM 602 can determine the amount of offset relative to the parking boundaries 606 and take the offset into account when scanning each of the vehicles 604. For example, if the ADM 602 detects that a vehicle 604 is parked over the boundary 606 by an offset of 2 feet, when scanning the adjacent parking spaces, the ADM 602 can offset the expected location for the vehicle by 2 feet.

The parking information collected by the ADMs described herein can be provided to one or more users. Exemplary users of parking information can include security personnel, control center personnel, parking lot or parking garage operators, building managers, facilities operators, law enforcement personnel, vehicle drivers, parking lot or parking garage users, and so on. Optionally, the parking information collected by the ADMs can be integrated or combined with existing parking information systems. For example, the parking information can be shared with an existing parking information system for a corporate campus for communication, display, analysis, and asset optimization.

The parking information can be transmitted by the ADM to one or more devices associated with the user, such as a computing device (e.g., computer, terminal, laptop, tablet, mobile device, etc.). In some embodiments, the ADM can transmit the information directly to the user device. Alternatively, the ADM can transmit the information to a remote computing system (e.g., a server), and the user can obtain the information from the computing system. The remote computing system may be implemented across any suitable combination of physical and virtualized computing resources, and may be a distributed computing system (e.g., a cloud server). The information transmission may occur in real-time, at predetermined time intervals, or suitable combinations thereof. The information can be displayed to the user on a device display (e.g., screen, monitor) via a suitable UI. The UI may be implemented as part of a software program running on the user device, such as a mobile phone application ("app"). Optionally, the user can interact with the displayed information via the UI using a suitable input interface (e.g., keyboard, mouse, joystick, touchscreen, etc.).

In some instances, a user may have a computing system at a remote site. For instance, a user at a security operations center may view information from the ADM. The security operations center may be remote to the monitored area or may be within or adjacent to the monitored area. In one example, the security operations center may be a security booth for a parking area or facility. In some instances, a user may carry a portable computing device. The user may optionally roam a monitored area. When a user is notified by an ADM of an incident that warrants further investigation, the user may travel to the location of the incident.

Exemplary parking information that may be presented on a UI include: location of parking spaces, availability or occupancy of parking spaces, vehicle and license plate information of occupying vehicles, time when parking spots were occupied or vacated, statistics of parking space and parking area utilization, and the like. Optionally, the UI can also present information regarding the predicted availability or occupancy within a parking area, such as predictions for availability and locations of available parking spaces. The prediction information can be provided on the level of individual parking spaces (e.g., each parking space is individually identified) or on the level of groups of parking spaces (e.g., parking spaces are aggregated and represented as regions rather than discrete spaces). The UI may represent the parking information using any suitable combination of graphics, images, video, audio, text, and so on. For example, the UI may provide images, video, audio, or other types of sensor data obtained by the ADM. The type, quantity, and arrangement of data presented in the UI can be adjusted based on the intended user of the parking information. For example, a UI used by law enforcement personnel may be more detailed than a UI used by an individual driver.

Figure 7A:
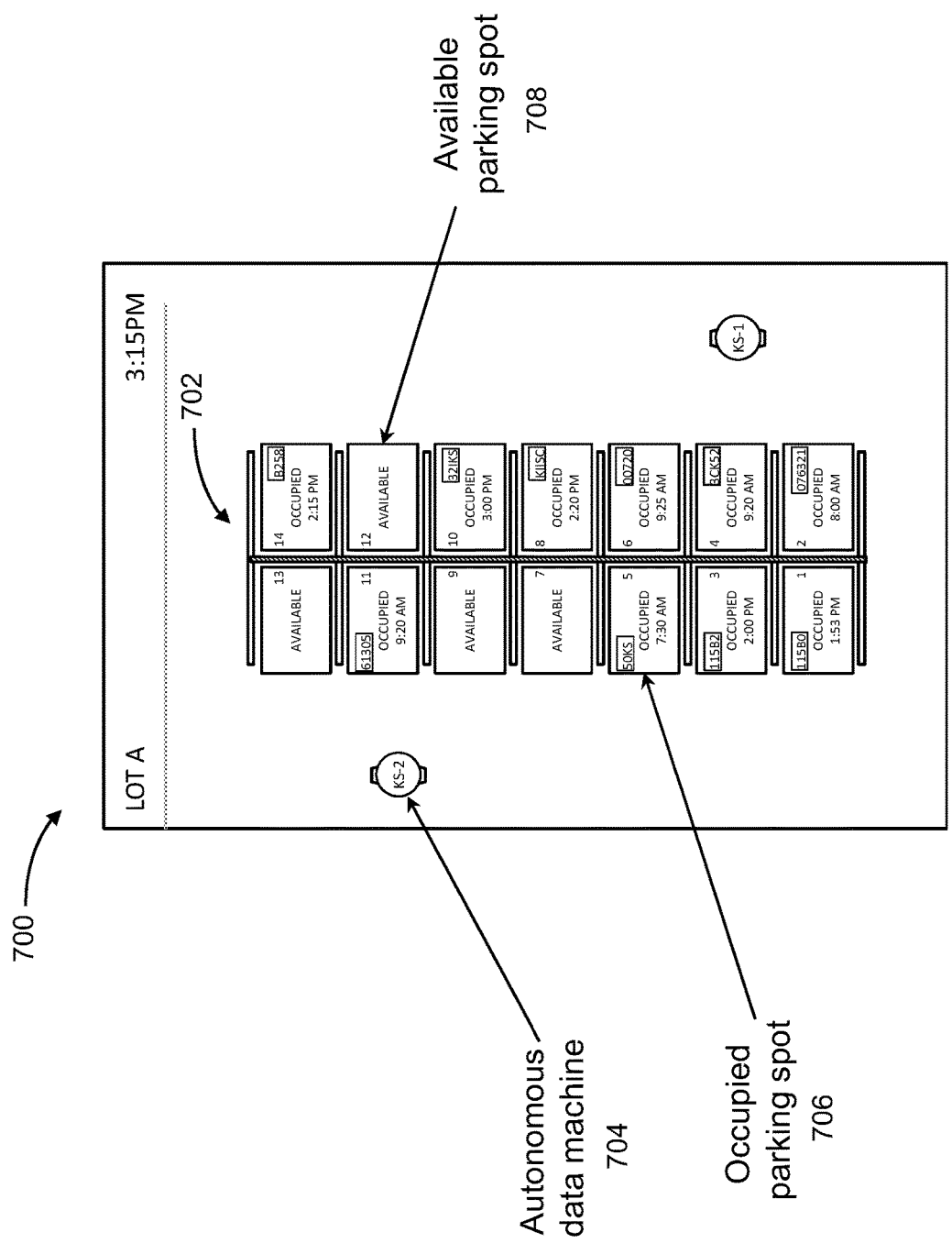
FIGS. 7A and 7B illustrate user interfaces for displaying parking information, in accordance with embodiments.

FIG. 7A illustrates a UI 700 displaying parking information, in accordance with embodiments. The UI 700 includes a graphical representation of a parking area 702 having a plurality of parking spaces. Optionally, the UI 700 can include a graphical representation of the location of one or more ADMs 704 within the parking area. Each ADM 704 can be depicted with a unique identifier, so as to enable the user to track the activity of each ADM 704 within the parking area 702. The UI 700 also includes graphical representations of occupied parking spaces 706 and unoccupied parking spaces 708. Occupied and unoccupied parking spaces 706, 708 can be differentiated using suitable graphical elements, such as color, patterning, labels, text, symbols, etc. For example, an occupied parking space 706 may be colored red and have an "occupied" label, while an occupied parking space 708 may be colored green and have an "available" label. The UI 700 can also include information regarding when each parking space was occupied or vacated, and information regarding the vehicle occupying the parking space. For example, for each occupied parking space 706, the UI 700 can display the time the space was first detected as being occupied and the license plate of the vehicle occupying the parking space.

Figure 7B:
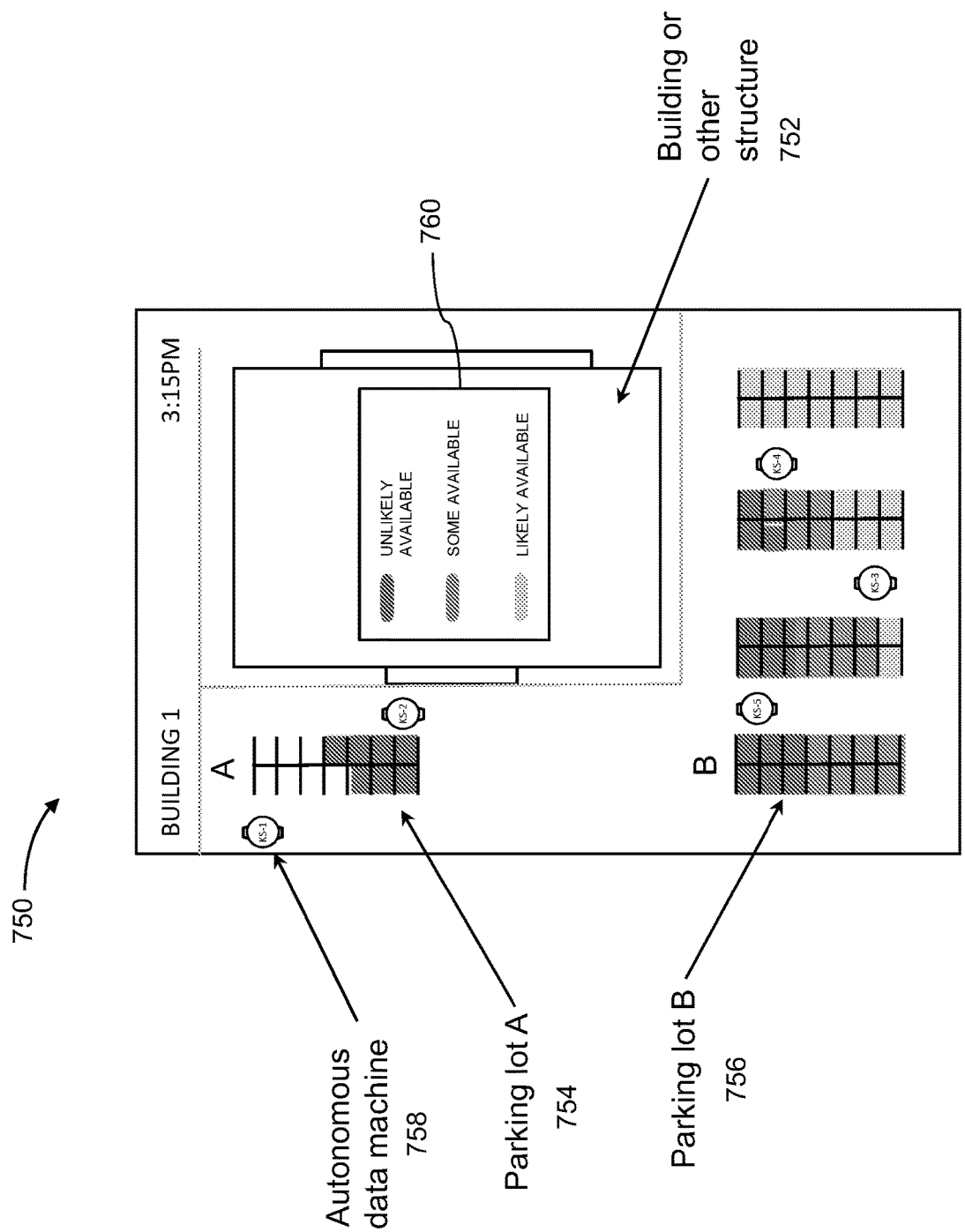

FIG. 7B illustrates a UI 750 displaying parking information, in accordance with embodiments. The UI 750 can include a graphical representation of a building or other structure 752 associated with a plurality of parking areas, such as a first parking lot 754 and a second parking lot 756. The position of the building 752 and the parking areas within the UI 750 can reflect the actual spatial relationship between the building 752 and parking areas. The UI 750 can also indicate the location of one or more ADMs 758 relative to the parking areas and the building 752. In some embodiments, the UI 750 can provide a visual depiction of the probability for the availability parking spots within the parking areas. For example, the probabilities can be displayed as a color-coded heat map, with "unlikely available" colored in red, "some available" colored in yellow, and "likely available" colored in green. The UI 750 can include a key 760 defining the various heat maps values for the user.

FIG. 7C shows an example of a UI 765 for parking utilization, in accordance with embodiments. The UI may show information regarding utilization of one or more parking sectors over time.

A parking sector 766 may have any level of granularity. For instance, a parking sector may be reviewed on a zone by zone basis, where a zone may include an area with one or more parking spaces. The zone may include parking spaces that are adjacent to one another. A parking zone may include one or more rows of parking spaces or blocks of parking spaces. In some instances, a zone may include one or more floors of a parking structure. In some instances, a zone may include a single parking space, or the sector may be divided according to single parking spaces or any of the other level of partitions. In some instances, the sectors may be divided according to one or more qualities of the parking spaces. For example, a first sector may include parking spaces for vehicles of certain types, while a second sector may include parking spaces for vehicles of different types (e.g., differentiating between parking spaces for vehicles of different types—e.g., motorcycles, sedans, SUVs, buses, etc.). In some instances, the vehicle types may refer to more than vehicle dimensions (e.g., handicapped vehicles, reserved spaces, carpool spaces, zipcar spaces, etc.).

For each sector, an indication of utilization 767 may be provided. An indication of utilization may provide some information about how much the corresponding sector is utilized. For instance, the indication of utilization may be divided in to multiple categories, and the corresponding category may be displayed. For example, the indication of utilization may be divided into high, medium, and low. In another example, the indication of utilization may be divided into a Grade A, Grade B, Grade C, Grade D, Grade E level of utilization. In some instances, the indication of utilization may include a numerical value or percentage reflective of the utilization. For instance, an indication of 87% may indicate that 87% of the parking spaces in Zone 1 were utilized. In another example, the indication of 124 may indicate that 124 parking spaces (out of a total number of sparking spaces) in the sector were utilized.

The indication of utilization may relate to a period of time over which the corresponding sector is assessed. In some instances, a start time 768 and an end time 769 of the period of time may be displayed. For instance, during a first period of time from 6:04:11 to 7:04:11, Zone 1 may have a low level of utilization. During a second period of time from 7:04:11 to 8:04:11, Zone 1 may have a medium level of utilization. The periods of time may all have the same length, or may have different lengths. The periods of time may have lengths on the order of seconds, minutes, hours, quarters of the day, half day, day, week, weeks, month, quarters, or years. In some instances, the periods of time that are displayed on the UI may be adjacent to one another so that there are no gaps in the time periods. Alternatively, there may be gaps provided between the time periods. There may or may not be overlaps in the time periods.

Displaying the utilization of a parking sector over time may provide a user with an indication of busy periods for the parking sector, or the overall utilization of the parking sector. In some instances, utilization of different parking sectors may be compared with one another. The utilization of the different parking sectors may occur at the same time on a side by side basis, or may occur over different periods of time. The comparison of utilization levels of multiple sectors may enable a user to determine which sectors are more likely to fill up, which may affect level of monitoring and/or maintenance at the various parking sectors.

Any of the information displayed on the UI may be collected with aid of one or more ADMs as previously described.

FIG. 7D shows an additional example of a UI 770 for parking utilization, in accordance with embodiments. The UI may show information regarding utilization of one or more parking sectors over time in a graphical form.

As previously described, a parking sector 771 may have any level of granularity. For instance, a parking sector may be reviewed on a zone by zone basis, where a zone may include an area with one or more parking spaces. The zone may or may not include parking spaces that are adjacent to one another. A parking zone may include one or more rows of parking spaces or blocks of parking spaces. In some instances, a zone may include one or more floors of a parking structure, or one or more sections of floors of parking structure. In some instances, a zone may include a single parking space, or the sector may be divided according to single parking spaces or any of the other level of partitions. In some instances, the sectors may be divided according to one or more qualities of the parking spaces. For example, a first sector may include parking spaces for vehicles of certain types, while a second sector may include parking spaces for vehicles of different types (e.g., differentiating between parking spaces for vehicles of different types—e.g., motorcycles, sedans, SUVs, buses, etc.). In some instances, the vehicle types may refer to more than vehicle dimensions (e.g., handicapped vehicles, reserved spaces, carpool spaces, zipcar spaces, etc.).

A visual indication of the sector may be provided. For instance, a drop down menu from which a user may select one or more zones may be provided. In some instances, the sectors may be divided in any other fashion, as described herein.

For each sector, an indication of utilization 772 may be provided. An indication of utilization may provide some information about how much the corresponding sector is utilized. For instance, the indication of utilization may be divided in to multiple categories, and the corresponding category may be displayed. For example, the indication of utilization may be divided into high, medium, and low. In another example, the indication of utilization may be divided into a Grade A, Grade B, Grade C, Grade D, Grade E level of utilization. In some instances, the indication of utilization may include a numerical value or percentage reflective of the utilization. For instance, an indication of 87% may indicate that 87% of the parking spaces in Zone 1 were utilized. In another example, the indication of 124 may indicate that 124 parking spaces (out of a total number of sparking spaces) in the sector were utilized.

The indication of utilization may relate to a period of time over which the corresponding sector is assessed. In some instances, various demarcations of periods of time 773 may be provided. The periods of time may have lengths on the order of seconds, minutes, hours, quarters of the day, half day, day, week, weeks, month, quarters, or years. In some instances, the periods of time that are displayed on the UI may be adjacent to one another so that there are no gaps in the time periods. Alternatively, there may be gaps provided between the time periods. There may or may not be overlaps in the time periods. In some instances, the periods of time may be based on hours of day, as provided by way of illustration.

The utilization of the parking sector for each period of time may be displayed in a graphical manner. For example, a bar graph, line graph, pictograph or any other type of graphical display may be provided. Displaying the utilization of a parking sector over time may provide a user with an indication of busy periods for the parking sector, or the overall utilization of the parking sector. In some instances, utilization of different parking sectors may be compared with one another. The utilization of the different parking sectors may occur at the same time on a side by side basis, or may occur over different periods of time. The comparison of utilization levels of multiple sectors may enable a user to determine which sectors are more likely to fill up, which may affect level of monitoring and/or maintenance at the various parking sectors.

Any of the information displayed on the UI may be collected with aid of one or more ADMs as previously described.

FIG. 7E shows an example of a UI 775 for a parking meter, in accordance with embodiments. The UI may show information regarding the length of time that one or more vehicles have been parked within a monitored area.

In some instances, ADMs may check parking information of various parking spaces over time. An ADM may take any action alone or in combination with communications from an external device (e.g., server, operations center, etc.). The ADM may detect a vehicle, and an external device (e.g., external computing server), may determine whether a vehicle is present based on the data from the vehicle. Any description herein of actions taken by the ADM may apply to the ADM taking actions alone, actions taken by an external device in communication with the ADM, or any combination of the ADM and external device. License plate information, such as license plate number, may be gathered by the ADMs. The license plate information may enable individual vehicles to be identified and monitored. For instance, a length of time that the individual vehicles are parked within the parking area may be monitored. The length of time may refer to the amount of time that the vehicles are parked in the same parking space. If the vehicles move to another parking space in the monitored parking area (e.g., parking lot, street, garage, etc.), the clock may start over from zero. Alternatively, the length of time may refer to the amount of time that the vehicle is parked in the monitored parking area, regardless of whether the vehicle is in the same parking space for that period of time or moves between different parking spaces in the same area.

Keeping track of the length of time that a vehicle is parked may be useful for monitoring the vehicles for suspicious activity, or for keeping track of vehicle presence for payment, parking rule or limit compliance, or data analysis. For example, if a vehicle is only allowed to remain parked in a parking area for maximum period of time (e.g., 10 minutes, 30 minutes, 2 hours, 4 hour, 6 hours), once the vehicle exceeds the maximum period of time, a notification or alert may be provided that may permit ticketing, fining, or towing of the vehicle. Similarly, a vehicle may pre-pay the length of time the vehicle is to be parked in a spot. If an individual paid for the vehicle to be in a spot for a predetermined length of time and the vehicle exceeds the predetermined length of time, a similar notification or alert may be provided that may permit ticketing, fining, automatic collection of additional fees, or towing of the vehicle. In some instances, the parking space may be provided for a particular application and the time that the vehicle is parked may be tracked to see if the vehicle exceeds the application. For instance, if the parking space is a charging station for an electric vehicle, the time limit may not significantly exceed the amount of time required to charge the vehicle. For instance, a vehicle may not be permitted to park for longer than a dwell time to charge the vehicle. If the vehicle exceeds the dwell time, notification or alert may be provided that may permit ticketing, fining, automatic collection of additional fees, or towing of the vehicle.

In some instances, vehicles with a greatest length of time parked at a location may be displayed on a UI 775. Identifying information about the vehicles, such as vehicle license plate number 776 may be displayed along with corresponding length of time 777 that the vehicle was parked. The length of time may be measured and/or displayed on the order of seconds, minutes, quarters of hour, half hour, hour, quarter of day, half day, days, weeks, months, etc. The order of time and/or granularity of time may be depend on how frequently an ADM may monitor the presence of the vehicle. For instance, if an ADM traverses a parking lot and only checks on a particular parking space and/or vehicle every hour or so, the length of time may be measured on the order of hours. If the ADM checks on the parking space and/or vehicle more frequently (e.g., constantly monitoring or monitoring every few minutes), the length of time may be measured more precisely (e.g., on the order of minutes). GPS data from the ADM may quickly allow identification of vehicles that have left the parking spot or moved to a different parking spot.

In some instances, the vehicles may be ranked according to length of time. The vehicles with the highest lengths of time may be displayed on a list. In some instances, a predetermined number of vehicles may make the list (e.g., the top ten vehicles, top twenty vehicles, etc.). Alternatively, any number of vehicles may be provided on the list as long the length of time exceeds a threshold value (e.g., any number of vehicles that have been parked for longer than 6 hours may be displayed). For instance, if a car is parked for over a predetermined period of time (e.g., 24 hours), an alert may be raised. A user may be alerted to the presence of the vehicle exceeding the period of time, or the vehicle may be added to a list. Ranking the vehicles may allow users who are viewing the information to particular vehicles to which the users may wish to monitor more closely or pay special attention.

Figure 7F:
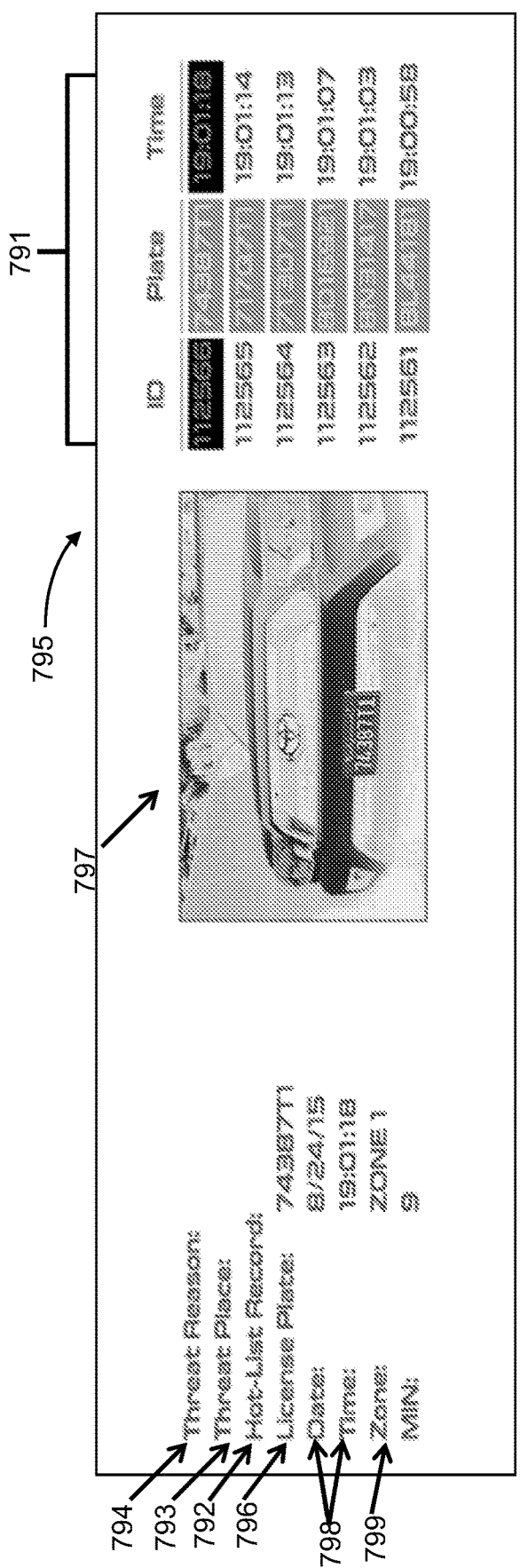

FIG. 7F shows an example of a UI 780 for a parking meter, in accordance with embodiments. The UI may show information regarding the length of time that one or more vehicles have been parked within a monitored area. The UI may optionally show graphical information about one or more of the vehicles that have been parked within the monitored area.

As previously described, ADMs may check parking information of various parking spaces over time. License plate information, such as license plate number, may be gathered by the ADMs. The license plate information may enable individual vehicles to be identified and monitored. For instance, a length of time that the individual vehicles are parked within the parking area may be monitored. The length of time may refer to the amount of time that the vehicles are parked in the same parking space. If the vehicles move to another parking space in the monitored parking area (e.g., parking lot, street, garage, etc.), the clock may start over from zero. Alternatively, the length of time may refer to the amount of time that the vehicle is parked in the monitored parking area, regardless of whether the vehicle is in the same parking space for that period of time or moves between different parking spaces in the same area.

In some instances, vehicles with a greatest length of time parked at a location may be displayed on a UI. In some instances, the vehicles with the greatest length of time may be provided on a sector by sector basis, such as a zone by zone basis 781. A visual indicator may be presented about the sector for which the vehicles are being listed. In some instances, the visual indicator may be a drop down menu or other type of graphical element.

Identifying information about the vehicles, such as vehicle license plate number 782 may be displayed along with corresponding length of time 783 that the vehicle was parked. The length of time may be measured and/or displayed on the order of seconds, minutes, quarters of hour, half hour, hour, quarter of day, half day, days, weeks, months, etc. The order of time and/or granularity of time may be depend on how frequently an ADM may monitor the presence of the vehicle.

In some instances, the vehicles may be ranked according to length of time. The vehicles with the highest lengths of time may be displayed on a list. In some instances, a predetermined number of vehicles may make the list (e.g., the top ten vehicles, top twenty vehicles, etc.). Alternatively, any number of vehicles may be provided on the list as long the length of time exceeds a threshold value (e.g., any number of vehicles that have been parked for longer than 6 hours may be displayed). For instance, if a car is parked for over a predetermined period of time (e.g., 24 hours), a flag may be raised. A user may be alerted to the presence of the vehicle exceeding the period of time, or the vehicle may be added to a list. Ranking the vehicles may allow users who are viewing the information to particular vehicles to which the users may wish to monitor more closely or pay special attention.

In some embodiments, a user may be able to view additional information regarding the ranked vehicle. For instance, a user may select one or the ranked vehicles 784 and corresponding information may be displayed. The corresponding information may include an image of the vehicle 784-1. The image of the vehicle may be a live image of the vehicle as collected by the ADM. When a user selects a particular ranked vehicle, the ADM may travel to the vehicle site and show a live image of the vehicle. In another example, the image may be the last image of the vehicle that the ADM took when the ADM was within a proximity of the vehicle. The ADM may or may not currently be within sensing range of the vehicle.

The corresponding information may include a map of the location 784-2. The map of the location may show a location at which the selected vehicle is detected. The map may show the selected sector (e.g., zone) for which the ranked vehicles are illustrated. The map may or may not show a location of the vehicle within the sector.

The corresponding information may include any historical or associated information about the vehicle such as, but not limited to, whether the vehicle is on a whitelist or blacklist, whether the vehicle is registered for the location, historical information about the vehicle such as prior violations or red flags, information about the owner of the vehicle, and the like.

Figure 7G:
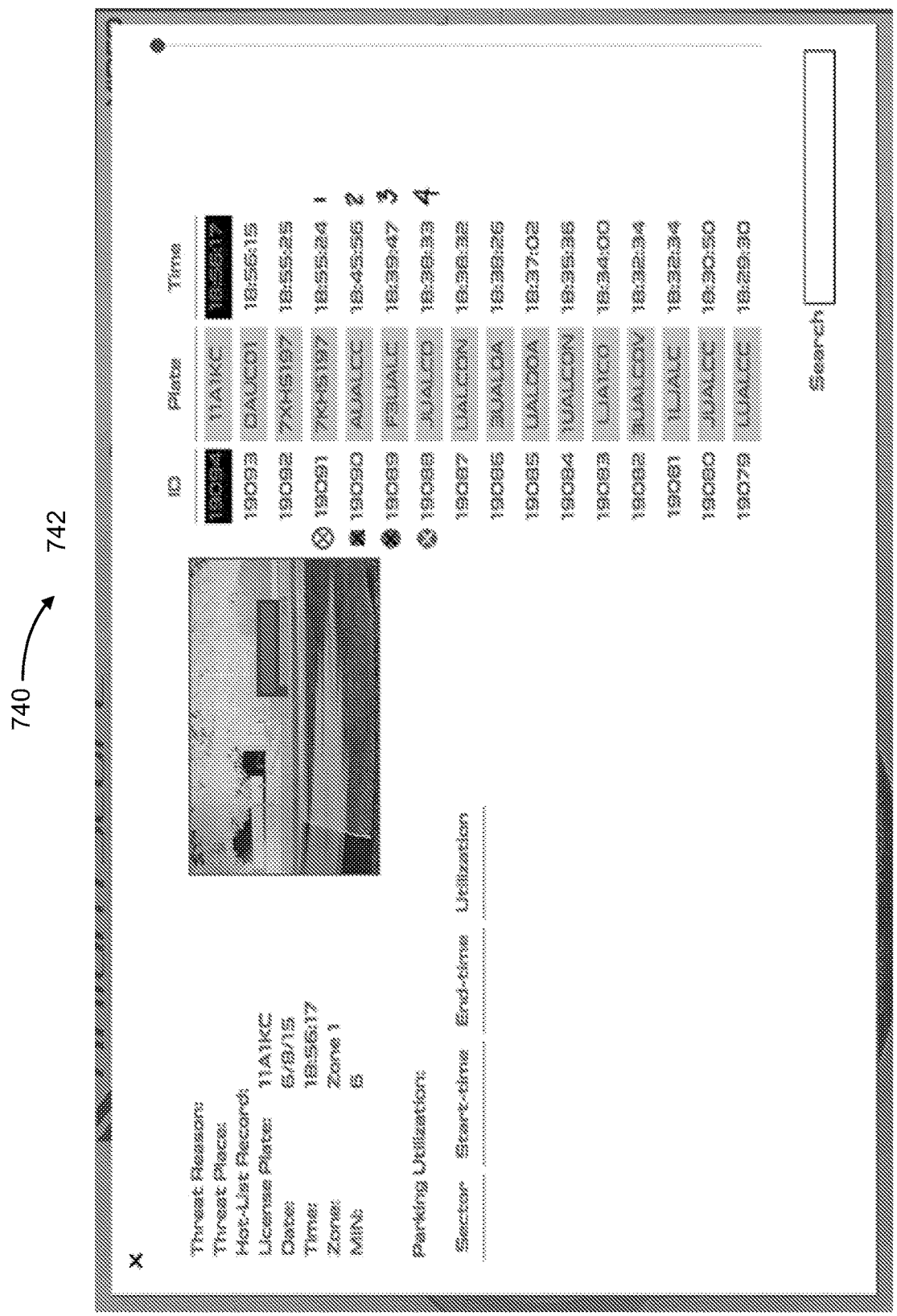
FIG. 7G illustrates a user interface for entering license plate information, in accordance with embodiments.

FIG. 7G illustrates a UI 785 for entering license plate information, in accordance with embodiments. In some embodiments, a user may enter vehicle information to add the vehicle to a white list, a black list, enforced list or an exclusion list. Any other type of type or categorization of list may be provided, and the white list, black list, enforced list, and/or exclusion list may be provided by way of example. For instance, a first category list, second category list, third category list, and/or fourth category list may be provided. Any number of categories having different characteristics may be provided.

A user may indicate a list type 786. In some instances, a drop down menu may be provided from which a user may select the list type. In other examples, a user may select a button or checkbox to indicate an applicable list. The available categories of list may be presented to the user and the user may select from the presented categories.

A user may provide identifying information about the vehicle, such as a license plate number 787. Information about an individual associated with the vehicle may be provided. For instance, an owner or driver's name 788 may be entered. In some instances, the information may be manually entered by one or more users. Optionally, the information may be provided from an external source, such as a law enforcement entity, corporate entity, or any other entity as described elsewhere herein.

A vehicle on a white list may have a specialized status. For instance, a vehicle on a white list may be considered to be above suspicious activity and may not be monitored as carefully as vehicles that are not on the white list. In some instances, a vehicle on a white list may have special parking privileges, such as the ability to park in certain parking spaces that vehicles not on the white list may not park. In other instances, the vehicles on the white list may be able to park for a longer period of time or an unlimited period of time, compared to vehicles that are not on the white list. Optionally, a vehicle on a white list may not be charged a parking fee or may be charged a reduced parking fee, compared to other vehicles that are not on the white list.

A vehicle on a black list may be excluded from parking within a monitored parking area. In some instances, a vehicle on the black list may not be permitted to park in the parking area. If the vehicle is detected in the parking area, an alert may be provided that may permit ticketing, fining, or towing of the vehicle. In some instances, vehicles on the black list may be vehicles that have been involved in suspicious activity or incidents in the past. The vehicles on the black list may be linked to one or more crimes. In some instances, law enforcement may provide information about vehicles that may be on the black list.

A vehicle on an enforced list may be permitted to park in a specific parking area. For instance, a parking lot may comprise one or more parking areas where specific vehicles have permits to park in that parking area while other vehicles do not have permission to park in the parking area. If a vehicle that is not on the enforced list is detected within the specific parking area, an alert may be provided that may permit ticketing, fining, or towing of the vehicle. The specific parking area may encompass a single parking space (e.g., only certain permitted vehicles are allowed to park in the single parking space), or multiple parking spaces (e.g., only certain permitted vehicles are allowed to park in the set of multiple parking spaces).

A vehicle on an exclusion list may be deemed to warrant additional monitoring. In some instances, vehicles on the exclusion list may be flagged as suspicious vehicles or vehicles that have been involved in various incidents in the past. The vehicles may be flagged as belonging to owners or drivers that have partaken in various incidents in the past. Vehicles on the exclusion list may be monitored more frequently by ADMs than vehicles that are not on the exclusion list. In some instances, more information about exclusion listed vehicles may be displayed on a user interface than vehicles that are not on the exclusion list. For instance, streaming videos of exclusion listed vehicles may be displayed on a user interface while normally videos of non-exclusion listed vehicles are not displayed. In some instances, a vehicle on an exclusion list may have reduced or limited parking privileges compared to vehicles not on the exclusion list, such as the ability to only park in certain limited parking spaces while vehicles not on the exclusion list may have a wider range of parking spaces to choose from. In other instances, the vehicles on the exclusion list may be able to park for a shorter period of time, compared to vehicles that are not on the exclusion list. Optionally, a vehicle on an exclusion list may be charged a greater parking fee, compared to other vehicles that are not on the exclusion list. A user may define the parameters that may place a vehicle on the exclusion list.

Figure 7H:
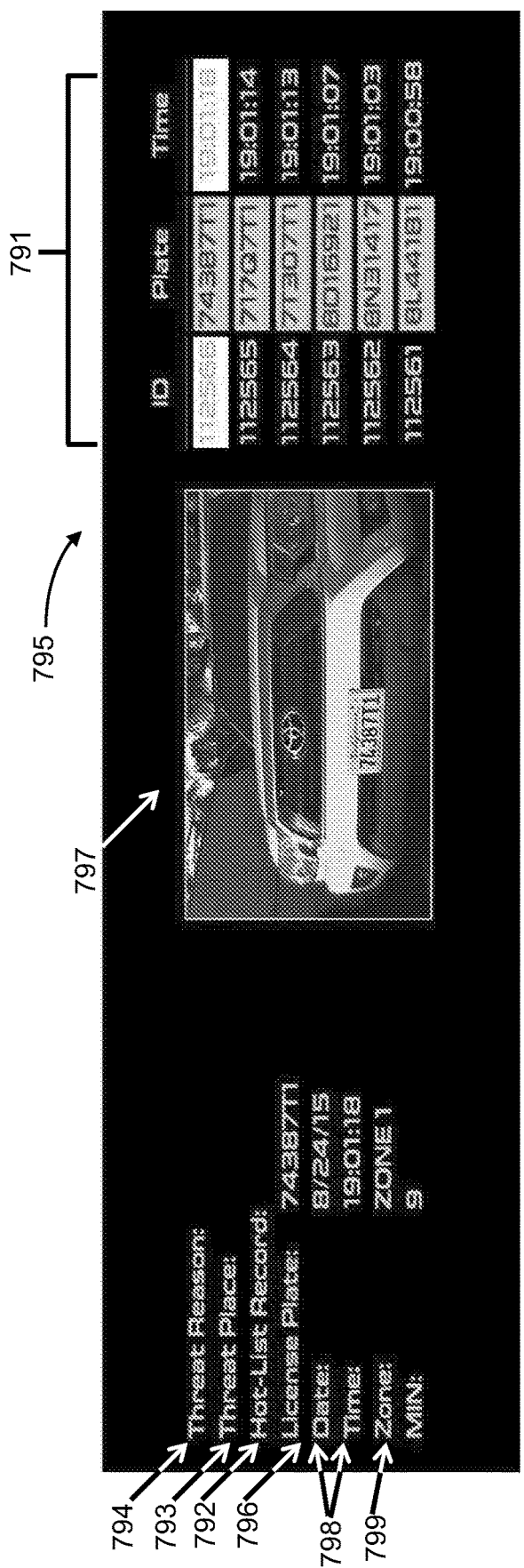
FIG. 7H illustrates a user interface for reviewing parking information, in accordance with embodiments.

FIG. 7H illustrates a UI 795 for reviewing parking information, in accordance with embodiments. The UI may be for an automatic license plate recognition (ALPR). A user may be able to view information about specific vehicles. For instance, a user may view a vehicle identifier, such as a license plate 796. A corresponding image of the vehicle and/or vehicle license plate 797 may also be viewed. The image may be a still image or a video stream. Information such as date and/or time 798 of when the information about the vehicle was captured (e.g., image was captured) may also be displayed. Information about the vehicle location 799 (e.g., sector—"ZONE 1", parking space number, etc.) may be displayed. Additional information about the vehicle may include an indication of a threat reason 794, a threat place 793, and/or a hot-list record 792. A threat reason, place, and/or hot-list record may be automatically provided with aid of an ADM, or from earlier records of a monitored parking area. In some instances, the information may be provided from a third party, such as law enforcement, social media, corporate entities, or any other entity as described elsewhere herein. Optionally, a user may manually enter in the information. The threats may be associated with the vehicle or an operator of the vehicle. Examples of threats may include, but are not limited to, vehicle accident, pedestrian accident, vandalism, breaking and entering, fire, crime, violence, or any other type of threat. In some instances, the threat may be detected with aid of an ADM. The ADM may send a notification that may add the information about the specific vehicle to the UI to be viewed by the user.

Optionally, a region 791 may be provided that may provide a summary of vehicles of interest. For instance, a vehicle ID, vehicle license plate information, and/or time may be displayed. The user may select one of the vehicles indicated in the region to view additional details about the vehicle. The summary region and the additional details about the vehicle may be simultaneously displayed on the same UI. The summary regions and the additional details may be displayed in a side by side manner. In some instances, a selected vehicle may be highlighted or otherwise visually emphasized. In some instances, the information displayed in the summary region may be sorted according to time. The most recent vehicle of interest may be displayed at a top of a list of vehicles in the summary region. In some instances, a limited number of vehicles may be displayed in a summary region at a time. Alternatively, any number of vehicles may be displayed in the summary region until they are cleared by a user.

One or more ADMs may monitor a parking area. The ADMs may detect a vehicle of interest. In some instances, a vehicle interest may be flagged by an ADM when a corresponding threat is detected with the vehicle, or if the vehicle is on a predetermined list (e.g., black list, exclusion list, white list). The ADM may send information about the vehicle of interest to be viewed by a user on a computing the device. The user may be at a remote station, such as a security operations center, or may be roaming about. The ADMs may advantageously detect and send information about specific vehicles for users to focus on and determine whether further investigation is warranted, whether in person or by the ADM.

Figure 7I:
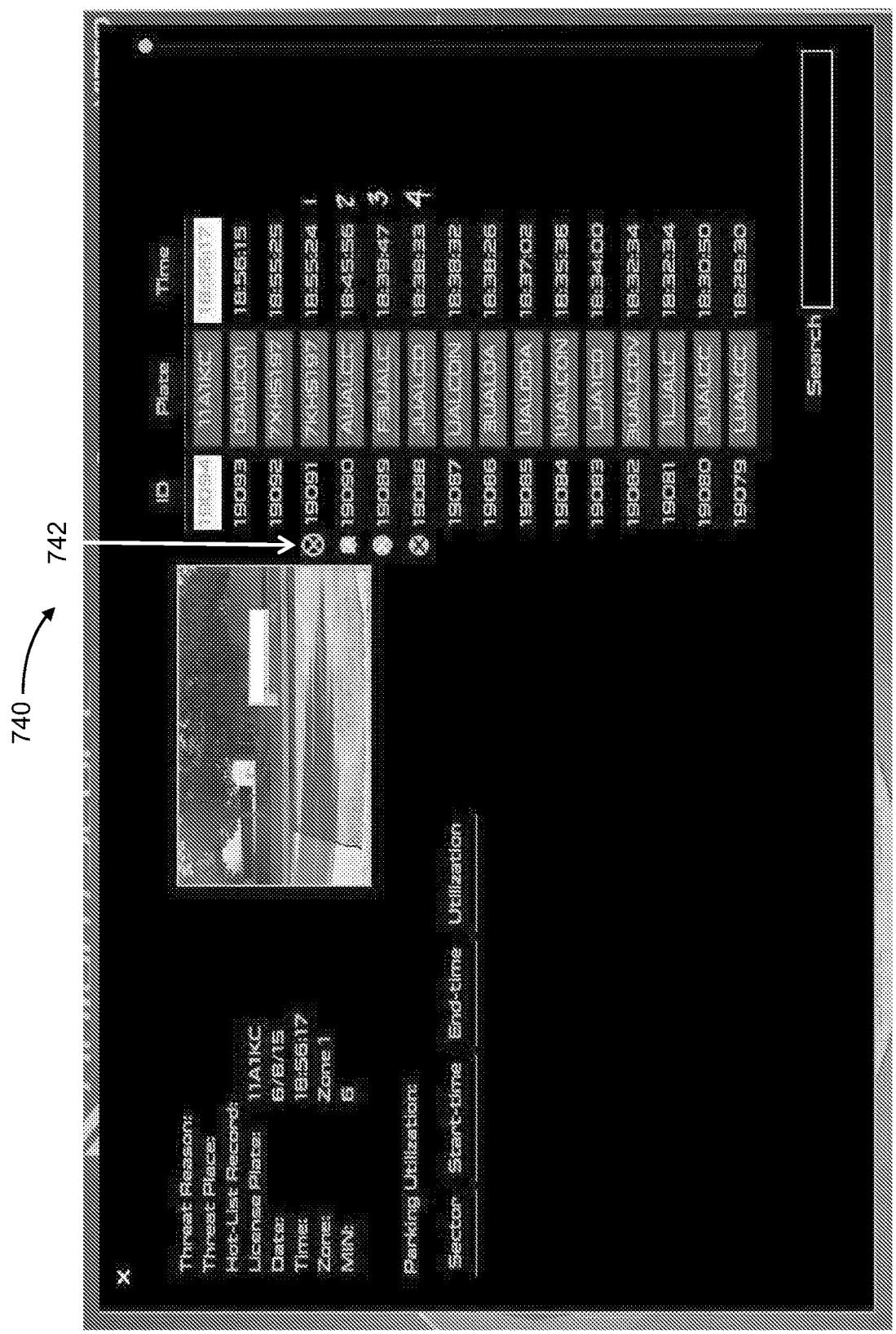
FIG. 7I illustrates a user interface through which a user can provide feedback regarding parking information, in accordance with embodiments.

FIG. 7I illustrates a UI 740 through which a user can provide feedback regarding parking information, in accordance with embodiments. For instance, a user may view the information provided collected using the ADM, such as vehicle identification information (e.g., license plate information). The user may provide feedback about the viewed information (e.g., whether it is correct, whether it is incorrect, whether there are modifications to be made). For instance, if a license plate number is provided by the ADM, the user may view an image of the license plate and indicate whether the license plate was correctly or incorrectly detected. In one example, a user may provide an 'X' or other type of visual indicator 742 to indicate that the license plate number is incorrect. In some instances, a user may provide feedback only if information is incorrect, otherwise it may be assumed to be correct. In other instances, a user may provide feedback on whether the information is correct or incorrect. In some instances, an assumption that the plate is correct if there is no feedback may or may not be provided. The UI may permit a plate validation feature. This may also be referred to as an ALPR accept or reject feature.

Providing feedback about an incorrect license plate number may allow a human user to check a reading of optical character recognition. Providing feedback may improve the accuracy of license plate recognition and/or optical character recognition algorithms. The algorithms may learn over time to have improved readings of license plate information or other forms of optical character recognition, with aid of the feedback from the user. In addition to optical character recognition, such feedback may be provided with any other type of machine vision or object recognition. Such feedback may be provided to train machine learning models for vehicle and license plate classification.

In some embodiments, the parking information described herein includes localization information for one or more objects associated with a parking area (e.g., vehicles, license plates, parking spaces, etc.). The localization information can indicate a current location of the object, such as via geo-coded coordinates (e.g., GPS, longitude, latitude). The localization information can be determined in a variety of ways. For example, the localization information can be determined based on maps of the parking area generated by the ADM (e.g., based on sensor data obtained by the ADM sensor), maps of the parking area provided to the ADM (e.g., stored onboard the ADM, transmitted to the ADM prior to or during operation), or suitable combinations thereof.

Figure 8B:
FIGS. 8A through 8G illustrate localization of objects in a parking area using maps, in accordance with embodiments.
Figure 8A:
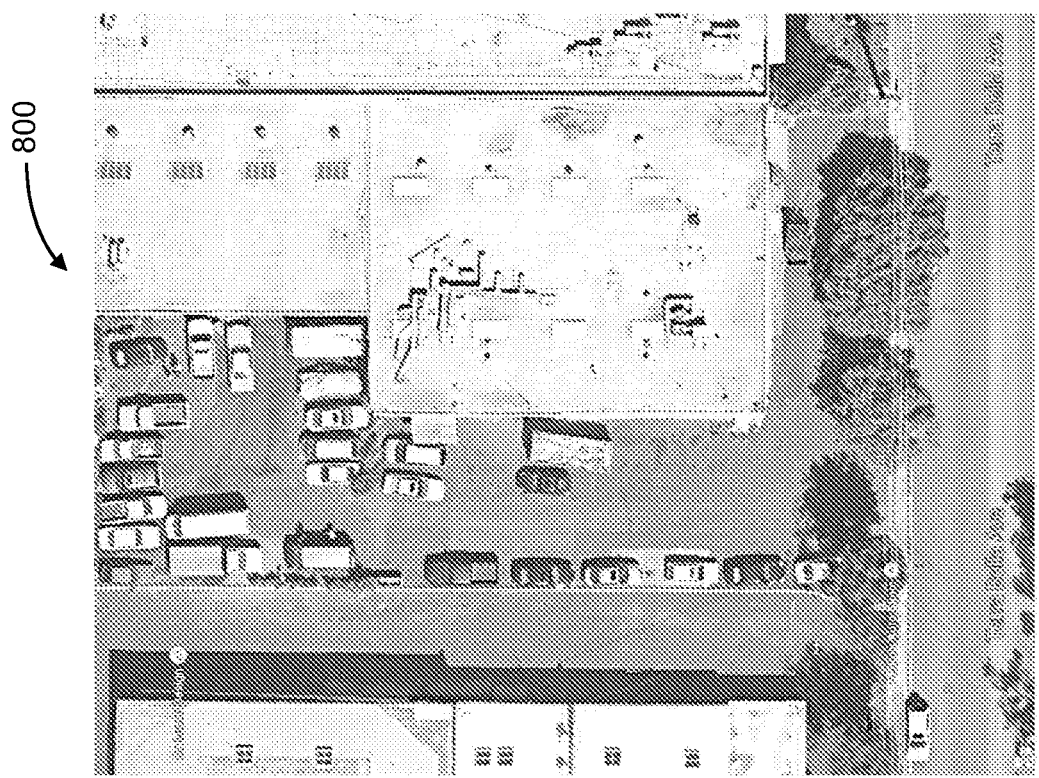

FIGS. 8A through 8G illustrate localization of objects in a parking area using maps, in accordance with embodiments. FIG. 8A illustrates a geo-coded cartographic map 800 of a parking area with superimposed satellite imagery. The cartographic map 800 can be a previously generated map of the parking area that is provided to the ADM prior to or during operation. FIG. 8B illustrates a geometric map 810 generated by the ADM using one or more sensors carried onboard the ADM. For example, the geometric map 810 can be generated using lidar, wheel odometry, IMUs, cameras, or combinations thereof, as well as suitable combinations of any of the ADM sensors described herein. In some embodiments, map generation is performed using simultaneous localization and mapping (SLAM) techniques and algorithms, such that the geometric map 810 is generated during operation of the ADM as it navigates within the parking area.

Figure 8D:
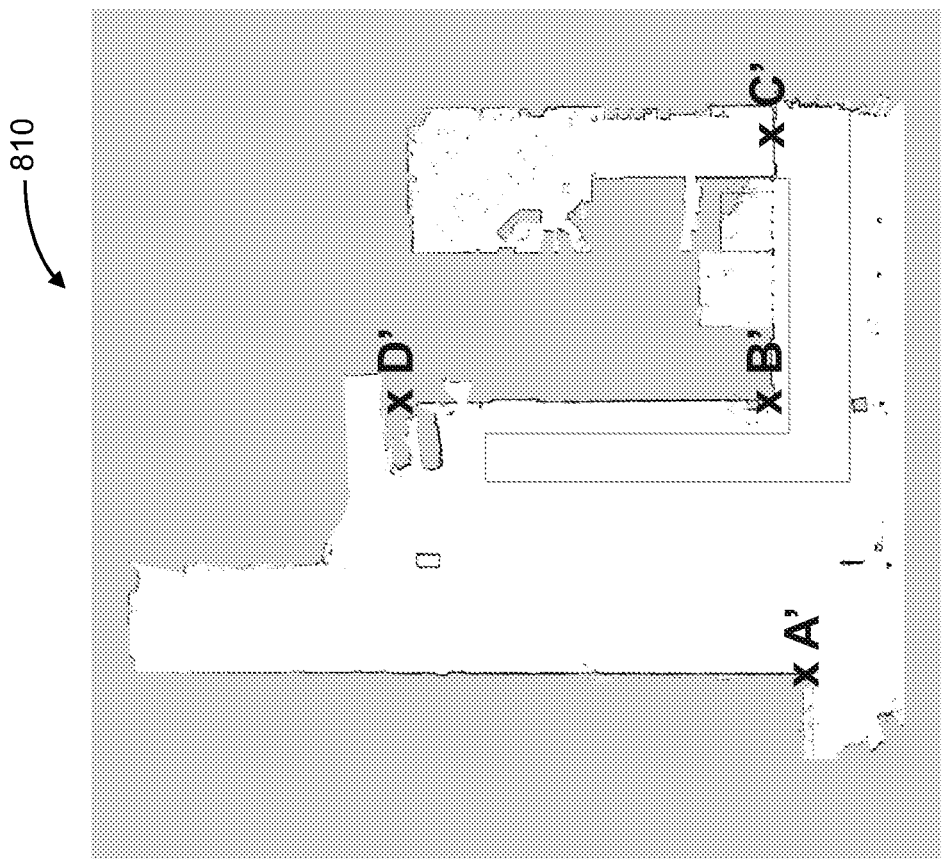
Figure 8C:
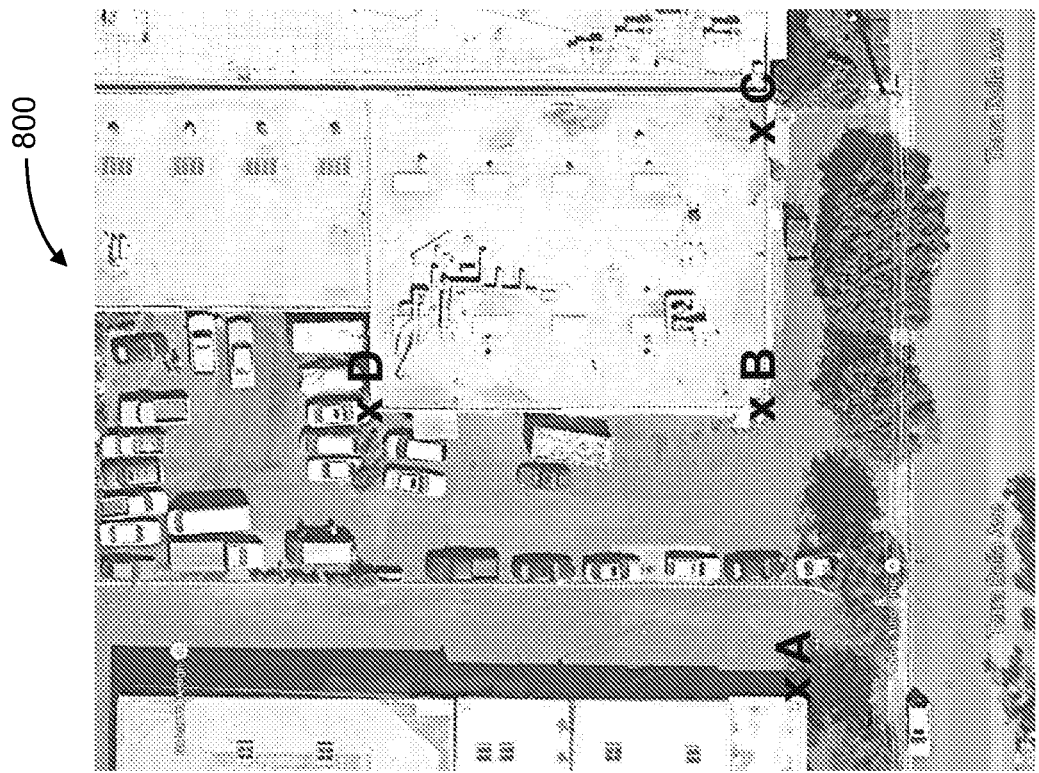

In some embodiments, the locations in the geo-coded cartographic map 800 correspond to the locations in the geometric map 810 generated by the ADM. FIGS. 8C and 8D illustrate reference locations (also known as reference points) in the cartographic map 800 (A, B, C, D) and corresponding locations in the geometric map 810 (A', B', C', D'), respectively. The reference points in the cartographic map 800 and the reference points in the geometric map 810 may represent similar or identical locations within the parking area. The reference points can be selected so as to have known geo-coordinates (e.g., longitude and latitude coordinates). For example, the reference points can include locations of landmarks, features, or other objects or structures (e.g., buildings, roads, or other stationary structures) that can be identified in both the cartographic map 800 and the geometric map 810. In some embodiments, the reference points in the cartographic map 800 and/or geometric map 810 can be identified with high accuracy from high-resolution maps, high-resolution GPS sensors, precise measurement points, other high-resolution sensors or data sources, or combinations thereof. Table 1 provides exemplary geo-coordinates for the reference points depicted in FIG. 8C.

TABLE 1

Geo-coordinates of reference points in a geo-coded cartographic map.

| Reference point | Geo-coordinate |
| --- | --- |
| A | 37.408605N, −122.075156W |
| B | 37.408635N, −122.074907W |
| C | 37.408635N, −122.074672W |
| D | 37.408911N, −122.074904W |

Figure 8F:
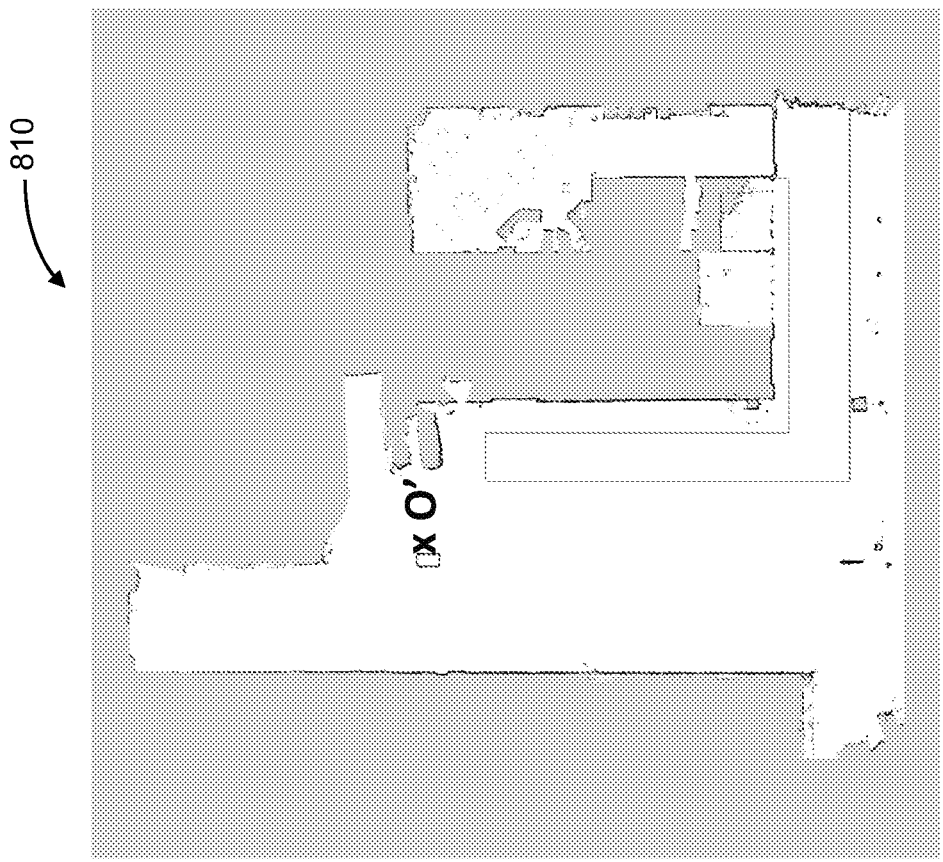
Figure 8E:
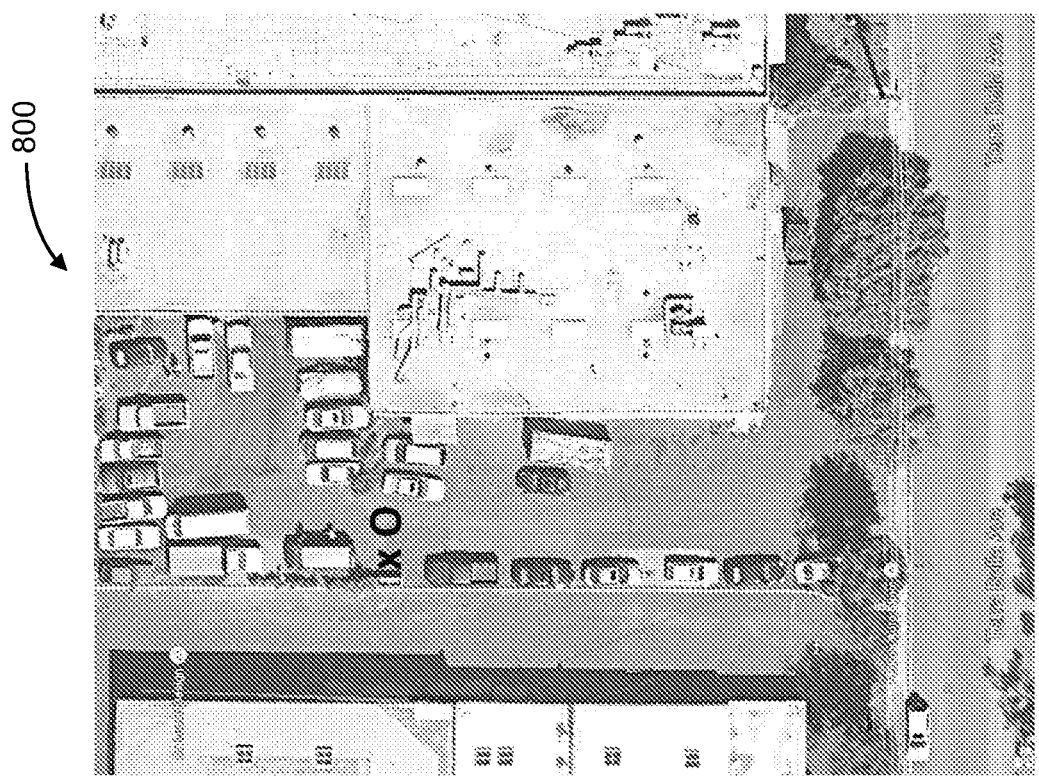

FIGS. 8E and 8F illustrate identification of an object using the geometric map 810 and the cartographic map 800. In some embodiments, when the ADM identifies an object (e.g., a vehicle, license plate, etc.), it can determine its location coordinates (O') relative to the generated geometric map 810. The corresponding location coordinates (O) of the object in the geo-coded cartographic map 800 can be calculated using triangulation between reference points in the geometric map 810 and the corresponding reference points in the cartographic map 800 so as to determine the location of the object in terms of geo-coordinates. In some embodiments, this triangulation utilizes at least three reference points having known coordinates in both the cartographic map 800 and the geometric map 810. This approach may provide improved localization accuracy compared to the use of GPS sensor data, as GPS accuracy may be limited in some instances and the GPS localization error may be larger than the object to be detected and localized (e.g., error of approximately +/−2 m).

Figure 8G:

FIG. 8G illustrates a map 820 including a plurality of sub-maps or sub-areas 822. The sub-maps 822 cover a smaller area of the entire map 820. Each sub-map 822 is associated with its own set of reference points that can be used to perform triangulation. The use of sub-maps can be advantageous in situations where triangulation using the entire map 820 is limited or is not sufficiently accurate. In some embodiments, when triangulating locations within a geo-coded cartographic map (e.g., the map 800) based on the locations within a corresponding geometric map generated using the ADM sensors (e.g., the map 810), the localization accuracy can be influenced by the size and 3D topography of the mapped area, as well as by the triangulation method used. For example, when using linear in-plane triangulation, the achievable location triangulation accuracy for a flat area may be higher than for non-flat areas (e.g., hilly or mountainous areas). Improved triangulation accuracy in such situations can be achieved by dividing the larger map 820 into small sub-maps 822, then performing the location triangulation separately within each sub-map 822 using the separate reference points for each sub-map 822. This approach can significantly improve the localization accuracy, e.g., to within 1 cm to 10 cm of accuracy.

Figure 9:
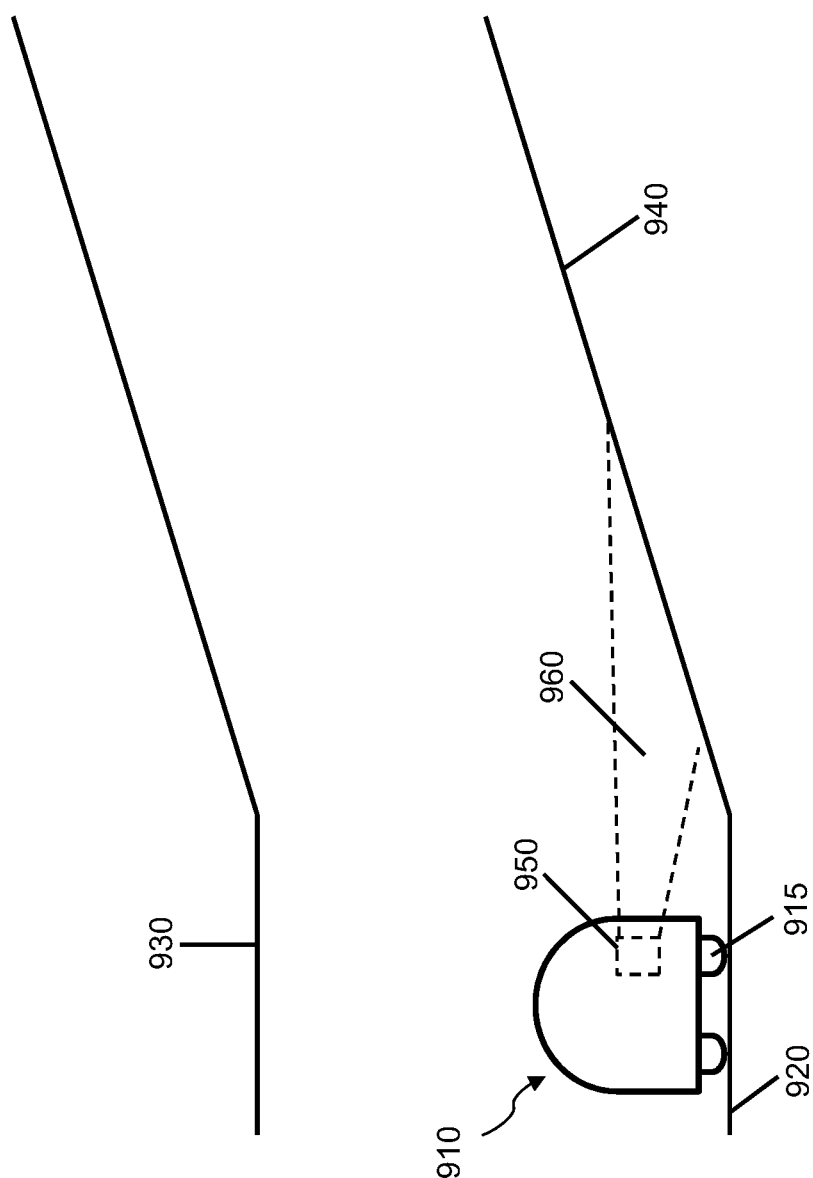
FIG. 9 shows an example of an autonomous data machine traversing a multi-level parking structure, in accordance with embodiments.

FIG. 9 shows an example of an autonomous data machine traversing a multi-level parking structure, in accordance with embodiments. In some embodiments, an ADM may be traversing a parking structure with a single floor or level. Alternatively, an ADM may traverse a parking structure with multiple floors or levels. The multiple floors or levels may or may not be stacked on top of one another. The multiple floors or levels may partially or completely positioned over one another. A multi-level parking structure may be multi-level parking garage. In some instances a ceiling within a parking garage may form as the floor of an overlying level. The multi-level parking structure may be above-ground, belowground, or any combination thereof. The multi level parking structure may be completely enclosed or partially enclosed. In some instances, openings may be provided on the side and/or top of the parking structure.

In some embodiments, ramps may connect different levels of a multi-level parking structure. In some instances, floors of the multi-level parking structure may be relatively flat. The floors of the multi-level parking garages may be arranged substantially orthogonally to a direction of gravity. The ramps may be used to connect flat floors of the multi-level parking structures. The ramps may or may not have parking spaces provided thereon. In some embodiments, the floors of the multi-level parking garages may be slanted. In some instances, the floors themselves may be constantly winding upwards or downwards, like the ramps. For instance, the floors may form a corkscrew type configuration. The floors may comprise one or more parking spaces for vehicles.

Optionally, one or more elevators may be provided within a parking structure. The elevators may traverse multiple levels of the parking structure.

An ADM 910 may traverse a floor 920 of a parking structure. The ADM may comprise one or more propulsion units 915 that may allow the ADM to traverse an environment. For instance, the propulsion units may comprise wheels, rollers, arms, legs, treads, propellers, movable surfaces, or any other component that may allow the ADM to traverse the environment. The ADM may be configured to traverse the environment without requiring an on-board driver or operator. An ADM may or may not be configured to carry a human passenger.

The floor 920 of the parking structure may have one or more underlying floors and/or one or more overlying floors 930. The ADM may travel between different floors of the parking structure. For instance, the ADM may travel up and/or down a ramp 940 of the parking structure. In some instances, the floors may be flat and connected with one or more ramps. In other instances, the floors may form ramps themselves and be slanted. The propulsion units may enable the ADM to traverse the ramp. The ADM may be able to traverse a ramp having a slope of at least 1:30, 1:20, 1:15, 1:12, 1:10, 1:8, 1:7, 1:6, 1:5, 1:4, 1:3, or 1:2. The ADM may be able to traverse a ramp having a slope less than any of these values, or falling within range between any two of these values. The propulsion units may permit the ADM to traverse a multi-level parking structure having areas of different slopes and/or variable slopes. For instance, the ADM may be able to traverse a flat floor and a sloped ramp. The ADM may use ramps to traverse the multiple levels of a parking structure. Alternatively or in addition, the ADM may use an elevator to traverse multiple levels of a parking structure.

The ADM may comprise one or more sensors 950 configured to sense an environment around the ADM and/or a state of the ADM. The one or more sensors may have a detectable range 960. The detectable range may be outside the ADM. The detectable range may be laterally around the ADM, above the ADM, or below the ADM. In some instances, the one or more sensors may collectively have a detectable range of at least 90 degrees, 180 degrees, 270 degrees, or 360 degrees laterally around the ADM. The one or more sensors may detect the presence or location of one or more parking spaces around the ADM. The one or more sensors may detect parking information for the one or more parking spaces, such as occupancy of the parking space, license plate information, or any other information about a vehicle or object that may be within the parking space. The one or more sensors may detect the presence of individuals in the area, and/or any details about the individuals or activities performed by the individuals. The one or more sensors may detect the presence of obstacles. The ADM may automatically avoid obstacles.

The one or more sensors may be useful for the detecting the presence of a ramp. The one or more sensors may be able to discern and differentiate the presence of a ramp from an obstacle. The ADM may automatically recognize a ramp and may traverse the ramp if that is a part of the ADM's travel path. In some instances, the one or more sensors may be able to detect and/or recognize the contours of the ramp. The one or more sensors may detect and/or recognize one or more feature points of the ramp and may distinguish the ramp from an obstacle, such as a barrier. The one or more sensors may be capable of detecting a slope of the ramp. The ADM may comprise one or more processors that may determine whether the ADM is capable of traversing the ramp. If the ADM is determined to be capable of traversing the ramp, the ADM may be permitted to traverse the ramp (e.g., upwards or downwards).

The one or more sensors may or may not be useful for detecting the presence of an elevator and/or recognizing one or more controls (e.g., buttons) of the elevator. The one or more sensors may be able to detect when elevator doors are open or closed. The one or more sensors may detect if a button to call the elevator (e.g., going in an up direction or down direction) has already been selected. The one or more sensors may be able to read a display on or near the elevator that indicates a level where the elevator is currently located. The one or more sensors may be capable of detecting buttons, displays, or parts of the elevator within an interior of the elevator. The ADM may have an appendage or robotic arm that may be capable of pressing a button or operating any other controls of the elevator.

The one or more sensors may be capable of detecting a state of the ADM. For instance, the one or more sensors may be capable of detecting location of the ADM (e.g., lateral positioning and/or altitude), orientation of the ADM (e.g., about a pitch axis, yaw axis, and/or roll axis), linear velocity of the ADM, angular velocity of the ADM, linear acceleration of the ADM, and/or angular acceleration of the ADM. The one or more sensors may be capable of detecting a power state of the ADM, a health state of the ADM, a state of a communications system of the ADM, or any other state of the ADM.

The one or more sensors may be capable of detecting when an ADM is positioned upright relative to the direction of gravity, or slanted relative to the direction of gravity. The one or more sensors may be configured to detect how much the ADM is slanted. The one or more sensors may detect when the ADM is on a ramp versus when the ADM is on a floor. One or more processors of the ADM may determine whether the angle that the ADM is slanted is within a range for the angle of the floor, or within a range for the angle of the ramp. In some embodiments, the one or more sensors may comprise one or more inertial sensors. The ADM may comprise an inertial measurement unit. The one or more sensors may comprise accelerometers, gyroscopes, magnetometers, gravity-based sensors, or any other types of sensors.

Determining whether the ADM is tilted or not may affect how data captured by the ADM is interpreted. For instance, the ADM may comprise one or more lidar units, vision sensors, ultrasonic sensors, or other types of sensors. In some instances, one or more of the sensors may be oriented primarily perpendicular to the ADM (e.g., parallel to the ground), whether the ground is slanted or not. When the ground is slanted (e.g., when the ADM is on a ramp, or when the floor itself is slanted), the top down view on a map showing the ADM may be 2-dimensional and may take the angle of the floor into account.

In some embodiments, a map may be useful for determining a location of the ADM relative to the parking structure. The ADM may be instructed to go to a particular location (e.g., point, line) to make a transition between floors. The ADM may be instructed to go to a particular location to make a transition from a floor to a ramp, or from a ramp to a floor. The particular location may be a reference location that may indicate a transition between floors or between different tilt angles (e.g., between a floor and a ramp). The location may be a particular set of coordinates (e.g., point location) for latitude and/or longitude. The location may be a line which may indicate a boundary at which the transition occurs.

Figure 10A:
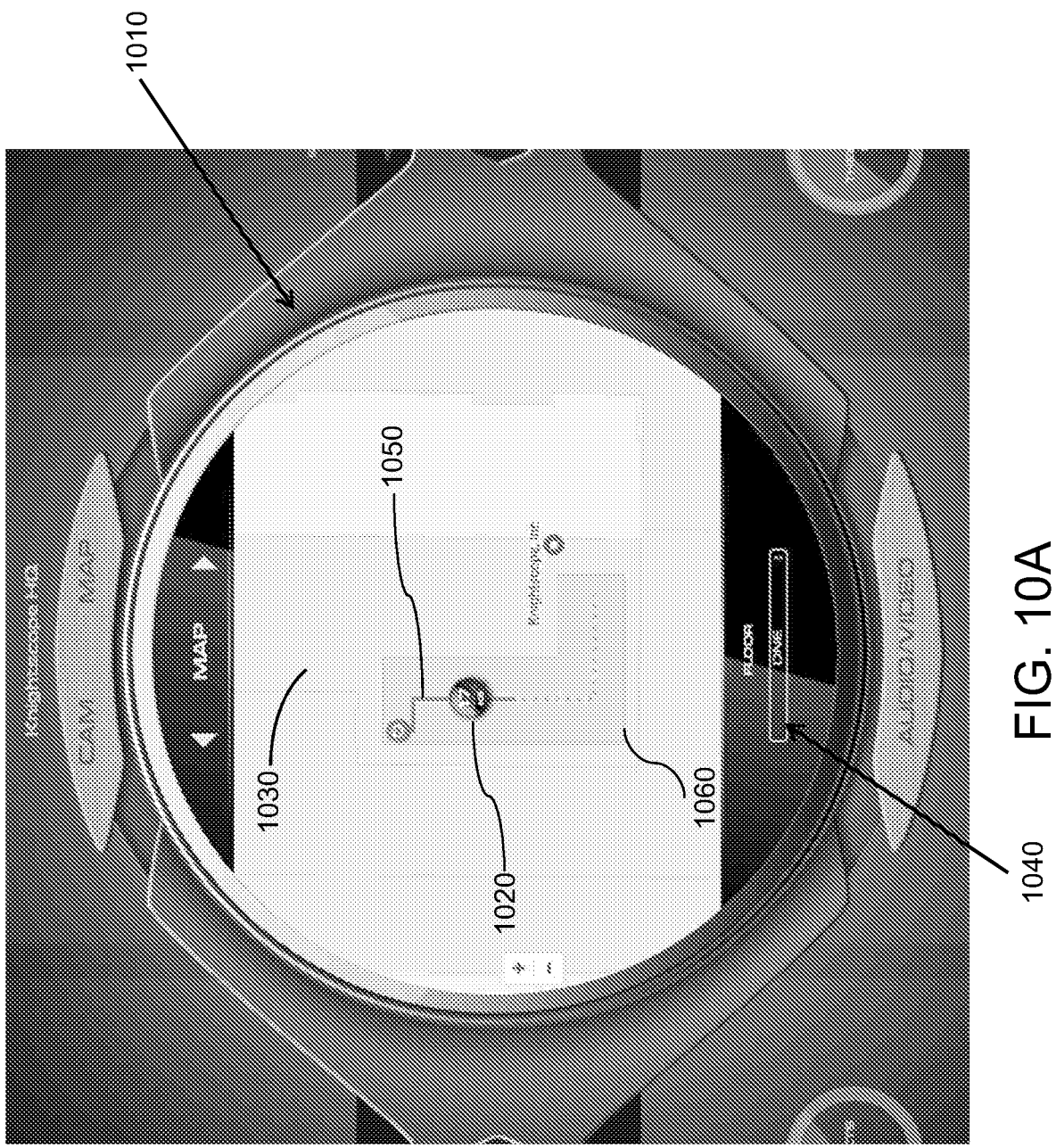
FIG. 10A shows an autonomous data machine traversing a multi-level parking structure on a floor of the parking structure, in accordance with embodiments.

FIG. 10A shows an autonomous data machine traversing a multi-level parking structure on a floor of the parking structure, in accordance with embodiments. A map 1010 may show a position of an ADM 1020 within a structure 1030. The structure may be a parking structure, such as a multi-level parking structure.

The map may be visible at an operations center that may be remote to the ADM. The operations center may be remote to the parking structure. The map may be visible on a display of one or more devices that may be remote to the ADM. The ADM may communicate wirelessly with the one or more devices (e.g., at the operations center), which may provide updated information that may be displayed on the map.

In some embodiments, the map may be a top-down view. The map may show a single floor of a multi-floor structure, such as a multi-floor parking garage, at a time. An indication of the floor level 1040 may be provided. For instance, if a first floor is being shown, the map may indicate that the floor level is one. If a second floor is being shown, the map may show that the floor level is two. In some embodiments, a user may be able to select the floor level being shown. For instance, a user may be able to toggle between different options for floor levels shown. For instance, the user may be able to select a floor level from a drop down menu to view the various floors. When the user selects a floor, the map for the floor may show whether an ADM is present on the selected floor or not.

In some instances, the default view on the map may be a level at which an ADM is present. For instance, if the parking structure has 5 floors, the default floor shown may be a floor upon which one or more ADMs are present. In some instances, multiple floors may have one or more ADMs present. In some instances, the default floor may be the lowest floor with an ADM present, or a floor with a greatest number of ADMs present. In some embodiments, an option may be presented for the map to follow an ADM. The user may or may not designate the identity of the ADM, or the ADM may be the only ADM present at the site. The map may follow the ADM so that the floor is automatically updated as the ADM moves around. The floor may be automatically updated to be the floor on which the ADM is present.

The location of the ADM 1020 on the floor may be shown. A route 1050 of the ADM may be illustrated. The route of the ADM may include a past route and/or predicted route of the ADM. The route may be a patrol route of the ADM, which the ADM may traverse regularly.

In some embodiments, a portion of the map may show a ramp 1060 of the parking structure. The portion of the map may show any portion of the parking structure that may traverse multiple floors. The route of the ADM may include a portion that may be on a ramp. In some instances, the route 1050 of the ADM that is shown may include portions that are on multiple floors. For instance, the route may traverse a ramp. In some embodiments, a solid line may indicate a part of the route that is on a selected floor of the building. A dotted line may indicate a part of the route that is on a different floor of the building.

For example, a route for an ADM may include a portion that is on a first floor and that goes up a ramp to a second floor. When the first floor is selected, the map may show the portion on the first floor as a solid line and the portion of the second floor as a dotted line. The ADM may be on the first floor while the first floor is shown. A visual indicator of which portions of the structure is a ramp may or may not be provided. When a ramp is shown, half of the ramp may be indicated as being on one floor while half of the ramp may be indicated as being on another floor. For example, a lower portion of the ramp may be designated as the first floor while the upper portion of the ramp may be designated as being on the second floor. In some embodiments, an entirety of the ramp may be designated for a particular floor. For example, an entirety of the ramp may be designated to a lower floor or to a higher floor. For instance, a ramp connecting the first and second floors may be designated as part of the first floor. Alternatively, the ramp may be designated as part of the second floor. The ADM may automatically create any number of maps for floors and/or ramps, and assign a level that makes sense from a user's perspective.

Optionally, a map may show a location of one or more elevators of a parking structure. When an ADM is within an elevator, the map may provide an indication as such. As the elevator traverses different floors, the floor level where the ADM is currently located may or may not be automatically updated. When an ADM gets off an elevator, the new floor level may or may not be automatically updated.

Figure 10B:
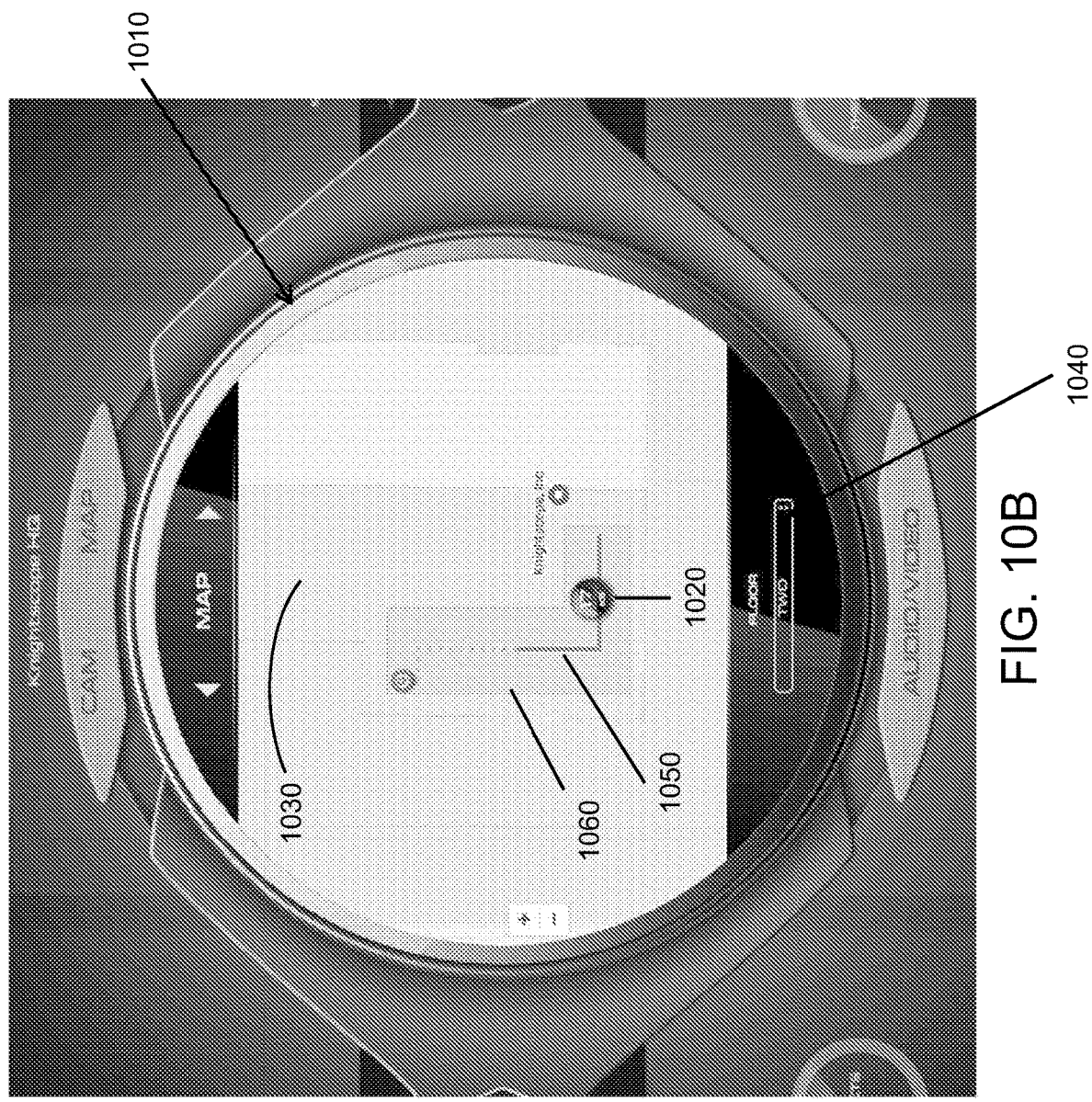
FIG. 10B shows an autonomous data machine traversing a ramp of a multi-level parking structure on a different floor of the parking structure, in accordance with embodiments.

FIG. 10B shows an autonomous data machine traversing a ramp of a multi-level parking structure on a different floor of the parking structure, in accordance with embodiments. In some embodiments, the map 1010 may be automatically updated to reflect the floor level 1040 that is currently occupied by the ADM 1020. For instance, if the ADM travels from a first floor to a second floor via a ramp, the map may be automatically updated to show the second floor, when the ADM crosses to the threshold of the second floor. In some instances, the threshold may be at the lower end of the ramp, the upper end of the ramp, or somewhere in between the upper and lower ends of the ramp.

The route 1050 of the ADM illustrated in the map may show a solid line for the portion of the route that is on the same floor that is currently being illustrated. The dotted line may show a portion of the route that is on another floor. For example, if the route traverses a first floor and a second floor, and the map is currently showing the second floor view, the portion of the route on the second floor may show up as a solid line, while the portion of the route on the first floor may show up as a dotted line.

In some embodiments, the map may show a direction in which the ADM is traveling. For instance, an arrow may be provided which may show the direction that the ADM is currently traveling. In some instances, the visual representation of the ADM on the map itself may indicate the direction that the ADM is traveling. For instance, the visual representation may have a shape pointing in the direction that the ADM is traveling, or may have a particular color or other visual emphasis in the direction that the ADM is traveling. In some instances, the visualization of the route may have an arrow or other indicator of the direction in which the ADM is traveling. The direction in which the ADM is traveling may be a lateral direction and/or vertical direction. For instance, the direction of the ADM laterally along the route may be shown. In some instances, an indication of whether the ADM is going up or down (e.g., up or down a ramp) may be shown.

Providing a two-dimensional map allowing a user to select the floor being viewed may simplify the calculations performed and/or the display of the map. A three-dimensional point model for the parking structure may or may not be generated. The altitude of the ADM may or may not be sensed. In some instances, an ADM may keep track of which floor it is on, without requiring an altitude measurement. In some embodiments, when an ADM detects an event, the ADM may provide the latitude and longitude of the ADM when the event is detected. The ADM may provide a floor level at which the ADM is present when the event is detected. The event may be any type of event as described elsewhere herein. For instance, the event may be collecting information about a parking space, detecting license plate information, detecting actions by individuals, detecting when a time limit at a parking space has been exceeded, detecting when a vehicle of a different type is parked at a parking space designated for a particular vehicle type, or detecting any security or safety concerns.

Figure 11:
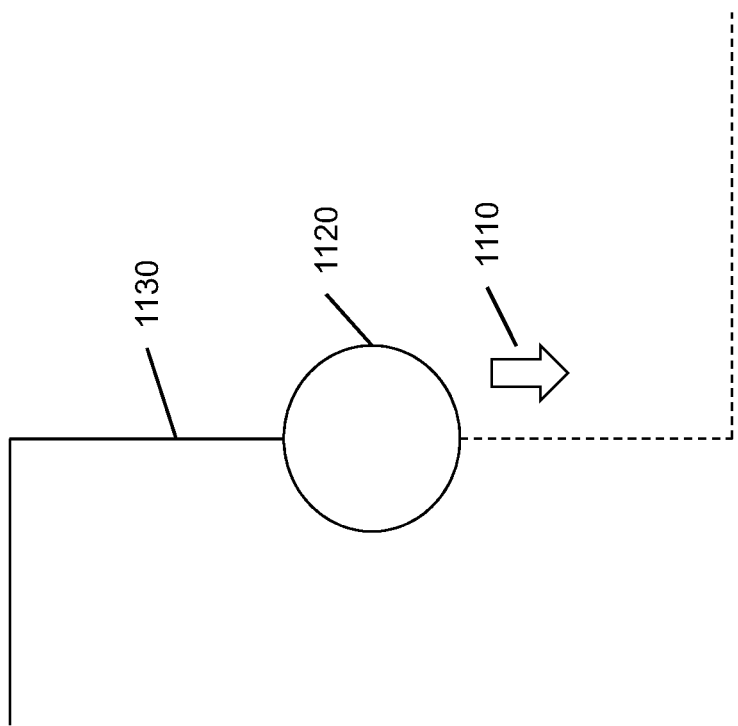
FIG. 11 shows an example of a visual marker that allows a user to switch between different levels displayed on a map of a parking structure, in accordance with embodiments.

FIG. 11 shows an example of a visual marker 1110 that allows a user to switch between different levels displayed on a map of a parking structure, in accordance with embodiments. In some embodiments, it may be desirable for an operator to be able to manually change the maps or floor levels as they provide instructions to the ADM, or if the ADM is stuck at the wrong spot.

The visual marker 1110 may be an arrow or other shape that a may be located near a transition between floors. The visual marker may be near where a solid line of a route 1030 transitions to a dotted line of a route or vice versa. The visual marker may be near a boundary between different floors, which may be at a bottom of a ramp, top of a ramp, or between the bottom and top of the ramp. The boundary may be near or at the halfway point of the ramp. The location of the ADM 1120 may also be visible.

In some embodiments, an operator may select the visual marker (e.g., click the arrow) to switch the floor shown on the map. The operator may select the visual marker when the ADM is near the transition (e.g., boundary). In some instances, the operator may provide instructions that navigate the ADM to the boundary (e.g., the operator my drive the ADM directly and/or manually), and may select the visual marker when the ADM is at or near the boundary.

Figure 12:
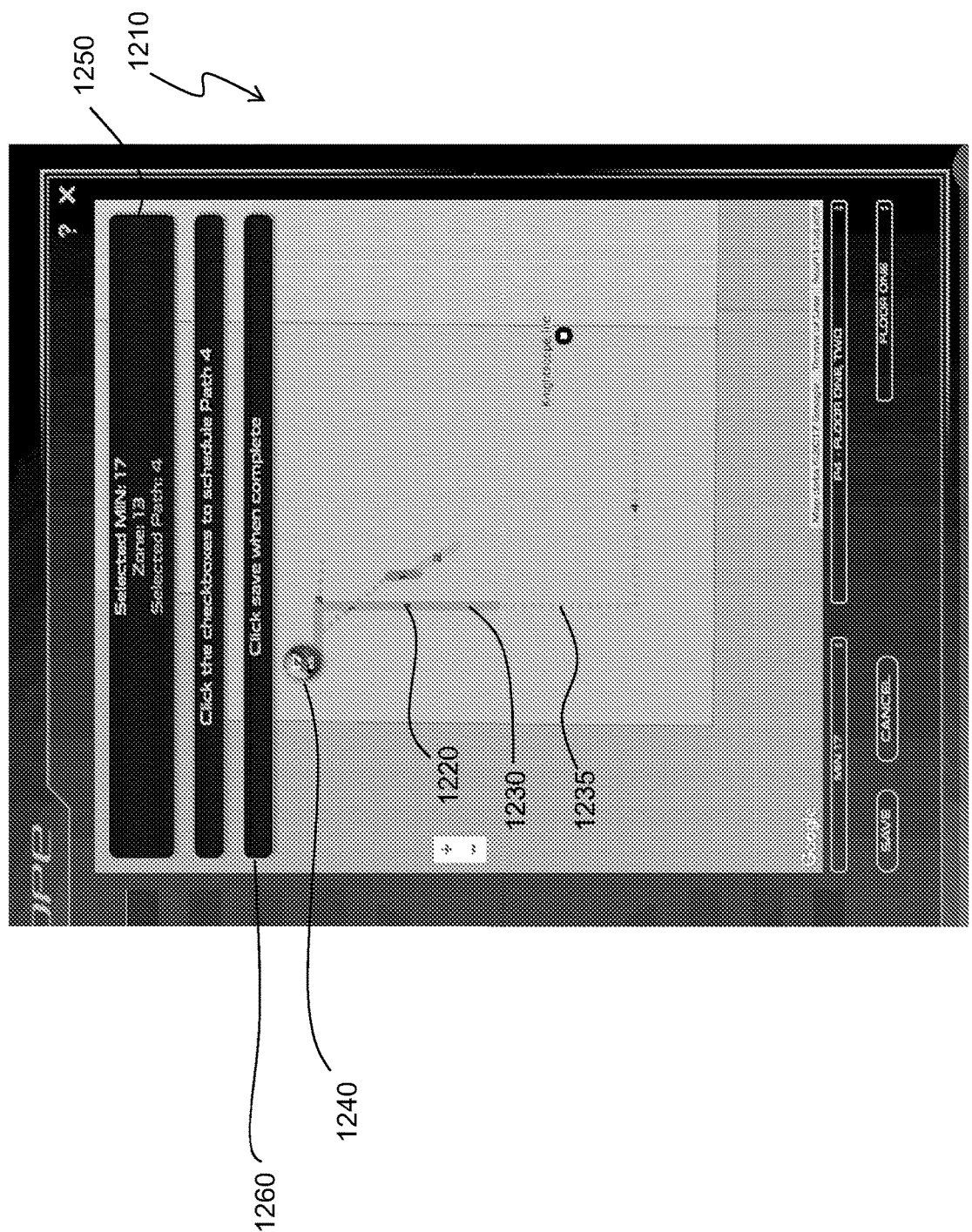
FIG. 12 shows an example of a patrol scheduler provided in accordance with embodiments.

FIG. 12 shows an example of a patrol scheduler 1210 provided in accordance with embodiments. A path of the ADM may be customized for different times of day, days of the week or month, or any other time period. In some instances, the ADM may patrol certain routes at certain times of day, or certain days of the week, month, or other time period. There may be alternative routes that the ADM may patrol depending on the time or date. A user may be able to set the different routes that the ADM may be able to patrol, and times/conditions at which the ADM would follow a particular route. In some instances, the users may be individual associated with the sites patrolled by the ADM. For instance, a parking structure operator may be able to designate the routes and which route the ADM would patrol at different times (e.g., different hours of the day, etc.).

In some instances, the various routes or portions of the routes may be numbered 1220 or identified in a different manner. The different routes or portions of routes that may be identified may be executed at different types or conditions.

The map may include solid lines 1230 and/or dotted lines 1235. The solid and dotted lines may follow the conventions as previously described. For instance, the solid lines may show the portions of the route that are on the floor that is currently being shown, while the dotted lines may be portions of the route that are on different floors than the one currently being shown.

In some instances, the scheduler may show the current position of the ADM 1240. The scheduler may also show information 1250 such as selected MIN [Knightscope: is this referring to minutes or something else?], selected zone, and/or selected path identifier (e.g., number). A user may save 1260 a route and/or time/conditions when the route will be executed.

The embodiments provided herein permit monitoring of various types of parking areas and environments (e.g., parking lots, parking garages, street parking, temporary parking) without requiring the use of special hardware or permanent installations. Furthermore, the operating parameters of the ADMs herein can be adjusted as appropriate (e.g., with respect to movement path, monitoring frequency, information collection capabilities) to enable monitoring of parking areas of varying sizes, types, and arrangements. Accordingly, the embodiments herein provide improved parking monitoring systems having greater flexibility, responsiveness, and convenience for users. In some embodiments, the methods, systems, and devices described herein can be implemented as part of a security strategy for improving the security of parking areas (e.g., deterrence and/or prevention of vehicle-related crimes, such as theft, vandalism, hit-and-run incidents).

The various techniques described herein may be partially or fully implemented using code that is storable upon storage media and computer readable media, and executable by one or more processors of a computer system. The processor can comprise array logic such as programmable array logic (hereinafter PAL), configured to perform the techniques described herein. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for collecting information associated with a parking space, the method comprising:
receiving parking information pertaining to the parking space from a self-propelled autonomous data machine, wherein the self-propelled autonomous data machine comprises one or more sensors;
displaying, at a remote computing system, the parking information;
receiving an instruction indicating a target vehicle parked in the parking space; and
generating control instructions to navigate the autonomous data machine to the target vehicle to collect information about the target vehicle via the one or more sensors, wherein the parking space is within a multi-level parking structure.

2. The method of claim 1, further comprising detecting one or more ramps connecting different levels of the multi-level parking structure while the autonomous data machine is navigating within the multi-level parking structure.

3. The method of claim 1, wherein the remote computing system is configured to display a floor of the multi-level parking structure which is occupied by the autonomous data machine.

4. The method of claim 1, wherein the instruction indicating the target vehicle is provided by a user at the remote computing system.

5. The method of claim 1, wherein the autonomous data machine is capable of navigating to the location near the target vehicle autonomously or semi-autonomously without direct manual control by a user.

6. The method of claim 1, wherein the one or more sensors includes a vision sensor and at least one other type of sensor.

7. The method of claim 1, wherein the parking information includes at least license plate information regarding a vehicle occupying the parking space when the vehicle occupies the parking space.

8. The method of claim 7, further comprising comparing the license plate information with a white list, black list, or exclusion list of vehicles.

9. The method of claim 7, further comprising displaying information about a threat associated with the license plate information when the threat is detected by the autonomous data machine.

10. The method of claim 1, wherein the information about the target vehicle includes at least a visual image of the target vehicle captured by the one or more sensors of the autonomous data machine.

11. A computing system for providing information associated with a parking space, the system comprising:
a display configured to show parking information pertaining to the parking space to a user, wherein the parking information is transmitted from a self-propelled autonomous data machine; a communication unit configured to receive the parking information from the self-propelled autonomous data machine, wherein the autonomous data machine (1) comprises one or more sensors, (2) receives an instruction indicating a target vehicle parked in the parking space (3) navigates to the target vehicle to collect information about the target vehicle via the one or more sensors, wherein the parking space is within a multi-level parking structure comprising the parking space for a vehicle.

12. The system of claim 11, wherein the display shows a floor of the multi-level parking structure occupied by the autonomous data machine.

13. The system of claim 12, wherein the display shows a location on a ramp connecting different floors occupied by the autonomous data machine when the autonomous data machine is on the ramp, as well as an indication of a portion of the ramp on a different floor.

14. The system of claim 11, wherein the display shows a parking utilization for one or more parking sectors within a monitored area.

15. The system of claim 14, wherein the instruction indicating the target vehicle is provided by the user via the display.

16. The system of claim 11, wherein the display shows vehicle identification information for one or more vehicles that are parked within a monitored area for a period of time that exceeds a predetermined time threshold.

17. The system of claim 11, wherein the display shows a visual map of a monitored area.

* * * * *